(12) United States Patent
Haider et al.

(10) Patent No.: US 12,471,018 B2
(45) Date of Patent: Nov. 11, 2025

(54) SYSTEMS AND METHODS OF SIGNALLING TARGET WAKE TIME SCHEDULES FOR MULTIPLE BASIC SERVICE SET IDENTIFIER (BSSID) SET AND OVERLAPPING BSS (OBSS)

(71) Applicant: Meta Platforms Technologies, LLC, Menlo Park, CA (US)

(72) Inventors: Muhammad Kumail Haider, Sunnyvale, CA (US); Chittabrata Ghosh, Fremont, CA (US); Chunyu Hu, Saratoga, CA (US); Binita Gupta, San Diego, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/501,935

(22) Filed: Nov. 3, 2023

(65) Prior Publication Data
US 2024/0155487 A1    May 9, 2024

Related U.S. Application Data

(60) Provisional application No. 63/460,175, filed on Apr. 18, 2023, provisional application No. 63/424,619, filed on Nov. 11, 2022, provisional application No. 63/422,565, filed on Nov. 4, 2022.

(51) Int. Cl.
*H04W 52/02*        (2009.01)
*H04W 84/12*        (2009.01)

(52) U.S. Cl.
CPC ........ *H04W 52/0206* (2013.01); *H04W 84/12* (2013.01)

(58) Field of Classification Search
CPC .............. H04W 52/0206; H04W 84/12; H04W 52/0216; Y02D 30/70
See application file for complete search history.

(56) References Cited

U.S. PATENT DOCUMENTS

| | | | |
|---|---|---|---|
| 2018/0132278 A1* | 5/2018 | Oteri ................. | H04W 74/0808 |
| 2019/0174577 A1 | 6/2019 | Patil et al. | |
| 2019/0208462 A1 | 7/2019 | Patil et al. | |
| 2019/0268846 A1* | 8/2019 | Xiao ................. | H04W 52/0229 |
| 2019/0297632 A1* | 9/2019 | Huang ................ | H04W 84/12 |
| 2021/0014784 A1* | 1/2021 | Kneckt ............... | H04W 52/0235 |
| 2021/0337613 A1* | 10/2021 | Seok ................ | H04W 76/15 |
| 2023/0021113 A1* | 1/2023 | Shafin ............... | H04W 52/0216 |
| 2023/0059237 A1 | 2/2023 | Shafin et al. | |

(Continued)

*Primary Examiner* — Marcus Smith
*Assistant Examiner* — Raenita Ann Fenner
(74) *Attorney, Agent, or Firm* — Foley & Lardner LLP

(57) ABSTRACT

A first access point (AP) device may include a transmitter and one or more processors. The transmitter may be associated with a first AP corresponding to a first basic service set identifier (BSSID). The one or more processors may be configured to generate a frame including information on a target wake time (TWT) schedule scheduled by a second AP corresponding to a second BSSID. The one or more processors may be configured to set a first subfield of the frame to indicate whether the first BSSID is the same as the second BSSID. The one or more processors may be configured to wirelessly transmit, via the transmitter over a wireless local area network (WLAN), the generated frame.

18 Claims, 13 Drawing Sheets

(56) References Cited

U.S. PATENT DOCUMENTS

| | | | |
|---|---|---|---|
| 2023/0102644 A1* | 3/2023 | Gan | H04W 48/16 |
| | | | 370/328 |
| 2023/0140312 A1* | 5/2023 | Ajami | H04W 74/0866 |
| | | | 370/329 |
| 2024/0032089 A1* | 1/2024 | Chitrakar | H04W 48/02 |

* cited by examiner

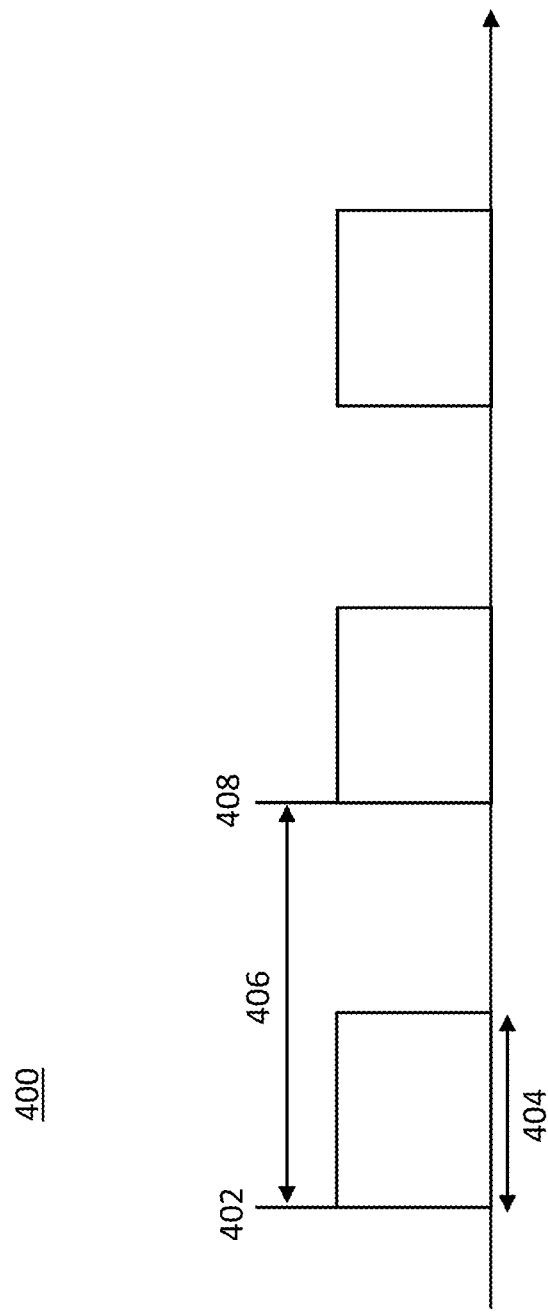

SYSTEMS AND METHODS OF SIGNALLING TARGET WAKE TIME SCHEDULES FOR MULTIPLE BASIC SERVICE SET IDENTIFIER (BSSID) SET AND OVERLAPPING BSS (OBSS)

CROSS-REFERENCE TO RELATED APPLICATION

This application claims priority to U.S. Provisional Patent Application No. 63/422,565 filed on Nov. 4, 2022, U.S. Provisional Patent Application No. 63/424,619 filed on Nov. 11, 2022, and Provisional Patent Application No. 63/460,175 filed on Apr. 18, 2023, which are incorporated by reference herein in their entirety for all purposes.

FIELD OF DISCLOSURE

The present disclosure is generally related to communication for rendering artificial reality, including but not limited to improving scheduling and/or announcing target wake time (TWT) schedules for a multiple basic service set identifier (BSSID) set and/or an overlapping BSS (OBSS).

BACKGROUND

Artificial reality, such as a virtual reality (VR), an augmented reality (AR), or a mixed reality (MR), provides immersive experience to a user. In one example, a user wearing a head wearable display (HWD) can turn the user's head to one side, and an image of a virtual object corresponding to a location and/or an orientation of the HWD and a gaze direction of the user can be displayed on the HWD to allow the user to feel as if the user is moving within a space of an artificial reality (e.g., a VR space, an AR space, or a MR space). An image of a virtual object may be generated by a computing device communicatively coupled to the HWD. In some embodiments, the computing device may have access to a network.

SUMMARY

Various embodiments disclosed herein are related to an access point (AP) device including a transmitter and one or more processors. The transmitter may be associated with a first basic service set identifier (BSSID). The one or more processors may be configured to generate a frame including information on a target wake time (TWT) schedule associated with a second BSSID. The one or more processors may be configured to set a first subfield of the frame to indicate whether the first BSSID is the same as the second BSSID. The one or more processors may be configured to wirelessly transmit, via the transmitter over a wireless local area network (WLAN), the generated frame.

In some embodiments, the TWT schedule may be a restricted TWT (R-TWT) schedule. The frame is a beacon frame or a probe response frame. The first BSSID and the second BSSID may be different from each other and may be included in a co-hosted BSSID set.

In some embodiments, the first BSSID and the second BSSID may be different from each other and are included in a multiple BSSID set. The information on the TWT schedule associated with the second BSSID may include information on a start time of a TWT service period of the TWT schedule. The frame may include a multiple BSSID element. The information on the TWT schedule associated with the second BSSID may be included in a TWT element outside the multiple BSSID element. The information on the TWT schedule associated with the second BSSID may be included in a TWT element in the multiple BSSID element.

In some embodiments, responsive to the first subfield of the frame indicating that the first BSSID is the same as the second BSSID, the one or more processors may be configured to set a second subfield of the frame to indicate a TWT identifier of the TWT schedule. Responsive to the first subfield of the frame indicating that the first BSSID is not the same as the second BSSID, the one or more processors may be configured to set the second subfield of the frame to indicate at least a portion of the second BSSID.

In some embodiments, responsive to the first subfield of the frame indicating that the first BSSID is the same as the second BSSID, the one or more processors may be configured to set the first subfield of the frame to one of a first value, a second value or a third value. The first value may indicate that the TWT schedule does not have any member device. The second value may indicate that the TWT schedule has at least one member device. The third value may indicate that the TWT schedule does not accept a request from a device to establish a new membership.

Various embodiments disclosed herein are related to a method including generating, by one or more processors of an access point (AP) device including a transmitter associated with a first basic service set identifier (BSSID), a frame including information on a target wake time (TWT) schedule associated with a second BSSID. The method may include setting, by the one or more processors, a first subfield of the frame to indicate whether the first BSSID is the same as the second BSSID. The method may include wirelessly transmitting, via the transmitter over a wireless local area network (WLAN), the generated frame.

In some embodiments, the TWT schedule may be a restricted TWT (R-TWT) schedule. The frame is a beacon frame or a probe response frame. The first BSSID and the second BSSID may be different from each other and may be included in a co-hosted BSSID set.

In some embodiments, the first BSSID and the second BSSID may be different from each other and are included in a multiple BSSID set. The information on the TWT schedule associated with the second BSSID may include information on a start time of a TWT service period of the TWT schedule. The frame may include a multiple BSSID element. The information on the TWT schedule associated with the second BSSID may be included in a TWT element outside the multiple BSSID element. The information on the TWT schedule associated with the second BSSID may be included in a TWT element in the multiple BSSID element.

In some embodiments, responsive to the first subfield of the frame indicating that the first BSSID is the same as the second BSSID, the one or more processors may set a second subfield of the frame to indicate a TWT identifier of the TWT schedule. Responsive to the first subfield of the frame indicating that the first BSSID is not the same as the second BSSID, the one or more processors may set the second subfield of the frame to indicate at least a portion of the second BSSID.

In some embodiments, responsive to the first subfield of the frame indicating that the first BSSID is the same as the second BSSID, the one or more processors may set the first subfield of the frame to one of a first value, a second value or a third value. The first value may indicate that the TWT schedule does not have any member device. The second value may indicate that the TWT schedule has at least one member device. The third value may indicate that the TWT schedule does not accept a request from a device to establish a new membership.

Various embodiments disclosed herein are related to a first access point (AP) device including a transmitter and one or more processors. The transmitter may be associated with a first AP corresponding to a first basic service set identifier (BSSID). The one or more processors may be configured to generate a frame including information on a target wake time (TWT) schedule scheduled by a second AP corresponding to a second BSSID. The one or more processors may be configured to set a first subfield of the frame to indicate whether the first BSSID is the same as the second BSSID. The one or more processors may be configured to wirelessly transmit, via the transmitter over a wireless local area network (WLAN), the generated frame.

In some embodiments, the TWT schedule is may be restricted TWT (R-TWT) schedule. The frame may be a beacon frame or a probe response frame. The first subfield may indicate that the first BSSID is not the same as the second BSSID. The information on the TWT schedule scheduled by the second AP may include information on a start time of a TWT service period of the TWT schedule.

In some embodiments, responsive to the first subfield indicating that the first BSSID is not the same as the second BSSID, the one or more processors may be configured to set a second subfield of the frame to indicate whether (1) the first BSSID and the second BSSID are included in a multiple BSSID set or (2) the second AP is associated with an AP device different from the first AP device. Responsive to the first subfield indicating that the first BSSID is the same as the second BSSID, the one or more processors may be configured to set a third subfield of the frame to indicate an identifier of the TWT schedule. Responsive to the second subfield indicating that the second AP is associated with an AP device different from the first AP device, the one or more processors may be configured to set the third subfield of the frame to indicate one of (1) a reserved field, (2) an identifier to identify the TWT schedule among TWT schedules scheduled by the second AP, or (3) an identifier to identify a BSS of the second AP. Responsive to the second subfield indicating that the first BSSID and the second BSSID are included in a multiple BSSID set, the one or more processors may be configured to set the third subfield of the frame to indicate one of (1) a reserved field or (2) an identifier to identify the TWT schedule among TWT schedules scheduled by the second AP.

In some embodiments, responsive to the first subfield indicating that the first BSSID is the same as the second BSSID, the one or more processors may be configured to set a fourth subfield of the frame to indicate a length of a TWT service period of the TWT schedule. Responsive to the second subfield indicating that the second AP is associated with an AP device different from the first AP device, the one or more processors may be configured to set the fourth subfield of the frame to indicate one of (1) a reserved field or (2) at least a portion of the second BSSID.

In some embodiments, responsive to the first subfield indicating that the first BSSID is the same as the second BSSID, the one or more processors may be configured to set a fifth subfield of the frame to indicate one or more types of frames that are transmitted during a TWT service period of the TWT schedule. Responsive to the second subfield indicating that the second AP is associated with an AP device different from the first AP device, the one or more processors may be configured to set the fifth subfield of the frame to indicate one of (1) a reserved field, (2) an identifier to identify the TWT schedule among TWT schedules scheduled by the second AP, or (3) an identifier to identify a BSS of the second AP.

In some embodiments, responsive to the first subfield indicating that the first BSSID is the same as the second BSSID, the one or more processors may be configured to set a sixth subfield of the frame to indicate a type of a message to set up a TWT session of the TWT schedule. Responsive to the second subfield indicating that the second AP is associated with an AP device different from the first AP device, the one or more processors may be configured to set the sixth subfield of the frame to indicate one of (1) a reserved field, (2) an identifier to identify the TWT schedule among TWT schedules scheduled by the second AP, or (3) an identifier to identify a BSS of the second AP.

Various embodiments disclosed herein are related to a method including generating, by one or more processors of a first access point (AP) device including a transmitter associated with a first AP corresponding to a first basic service set identifier (BSSID), a frame including information on a target wake time (TWT) schedule scheduled by a second AP corresponding to a second BSSID. The method may include setting, by the one or more processors, a first subfield of the frame to indicate whether the first BSSID is the same as the second BSSID. The method may include wirelessly transmit, via the transmitter over a wireless local area network (WLAN), the generated frame.

In some embodiments, the TWT schedule may be a restricted TWT (R-TWT) schedule. The frame may be a beacon frame or a probe response frame. The first subfield may indicate that the first BSSID is not the same as the second BSSID. The information on the TWT schedule scheduled by the second AP may include information on a start time of a TWT service period of the TWT schedule.

In some embodiments, responsive to the first subfield indicating that the first BSSID is not the same as the second BSSID, the one or more processors may set a second subfield of the frame to indicate whether (1) the first BSSID and the second BSSID are included in a multiple BSSID set or (2) the second AP is associated with an AP device different from the first AP device. Responsive to the first subfield indicating that the first BSSID is the same as the second BSSID, the one or more processors may set a third subfield of the frame to indicate an identifier of the TWT schedule. Responsive to the second subfield indicating that the second AP is associated with an AP device different from the first AP device, the one or more processors may set the third subfield of the frame to indicate one of (1) a reserved field, (2) an identifier to identify the TWT schedule among TWT schedules scheduled by the second AP, or (3) an identifier to identify a BSS of the second AP. Responsive to the second subfield indicating that the first BSSID and the second BSSID are included in a multiple BSSID set, the one or more processors may set the third subfield of the frame to indicate one of (1) a reserved field or (2) an identifier to identify the TWT schedule among TWT schedules scheduled by the second AP.

In some embodiments, responsive to the first subfield indicating that the first BSSID is the same as the second BSSID, the one or more processors may set a fourth subfield of the frame to indicate a length of a TWT service period of the TWT schedule. Responsive to the second subfield indicating that the second AP is associated with an AP device different from the first AP device, the one or more processors may set the fourth subfield of the frame to indicate one of (1) a reserved field or (2) at least a portion of the second BSSID.

In some embodiments, responsive to the first subfield indicating that the first BSSID is the same as the second BSSID, the one or more processors may set a fifth subfield of the frame to indicate one or more types of frames that are transmitted during a TWT service period of the TWT schedule. Responsive to the second subfield indicating that the second AP is associated with an AP device different from the first AP device, the one or more processors may set the fifth subfield of the frame to indicate one of (1) a reserved field, (2) an identifier to identify the TWT schedule among TWT schedules scheduled by the second AP, or (3) an identifier to identify a BSS of the second AP.

In some embodiments, responsive to the first subfield indicating that the first BSSID is the same as the second BSSID, the one or more processors may set a sixth subfield of the frame to indicate a type of a message to set up a TWT session of the TWT schedule. Responsive to the second subfield indicating that the second AP is associated with an AP device different from the first AP device, the one or more processors may set the sixth subfield of the frame to indicate one of (1) a reserved field, (2) an identifier to identify the TWT schedule among TWT schedules scheduled by the second AP, or (3) an identifier to identify a BSS of the second AP.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 4 is a timing diagram showing a wake-up/sleep schedule of a computing device utilizing TWT, according to an example implementation of the present disclosure.

DETAILED DESCRIPTION

Figure 1:
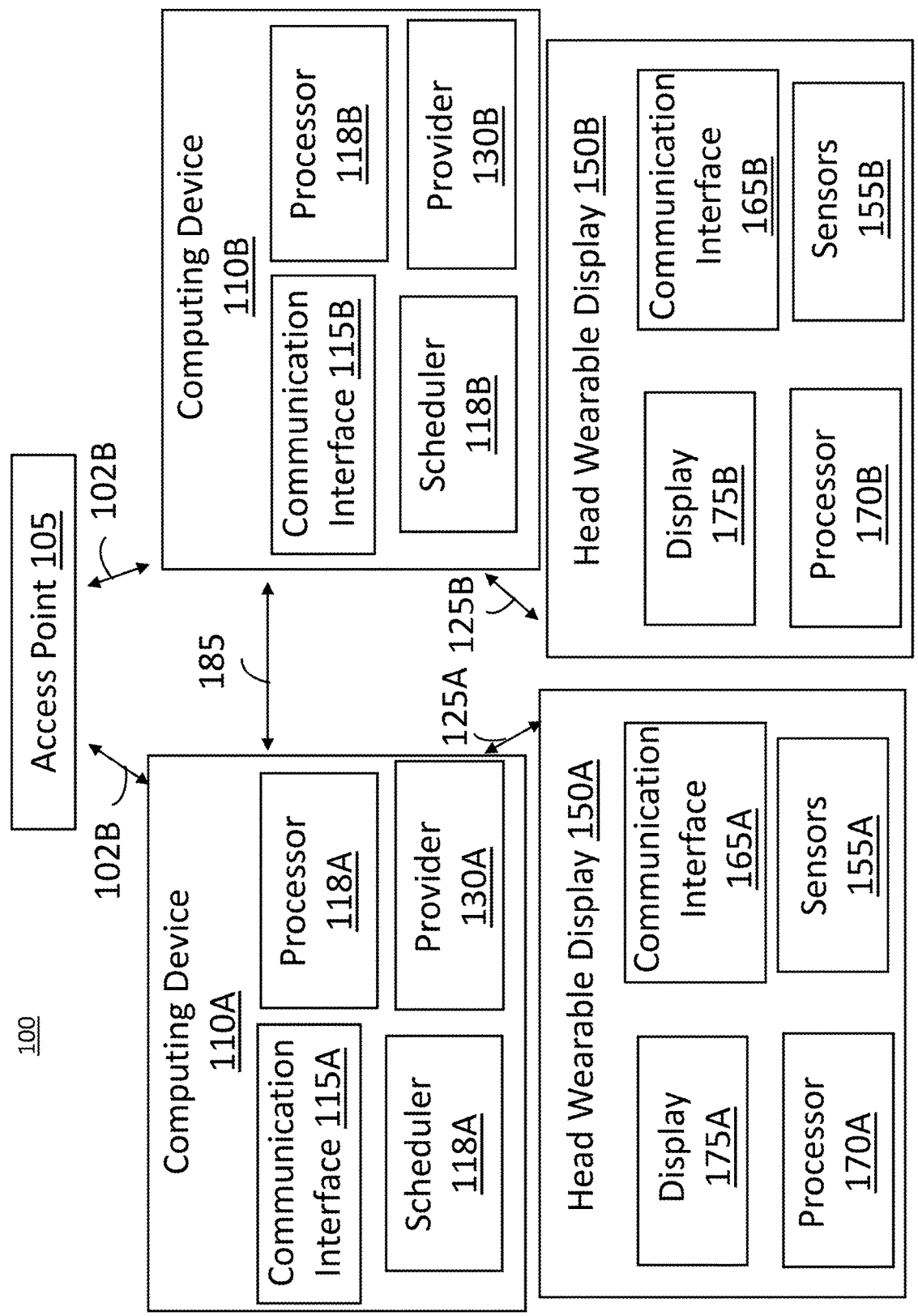
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Streams of traffic may be characterized by different types of traffic. For instance, an application may be characterized by latency sensitive traffic (e.g., video/voice (VI/VO), real time interactive applications, and the like) or regular traffic (e.g., best effort/background applications (BE/BK)). Latency sensitive traffic may be identifiable or characterized, in part, based on its bursty nature (e.g., periodic bursts of traffic), in some embodiments. For instance, video display traffic may be driven by a refresh rate of 60 Hz, 72 Hz, 90 Hz, or 120 Hz. An application and/or device may have combinations of traffic types (e.g., latency sensitive traffic and non-latency sensitive traffic). Further, each stream of traffic for the application and/or device may be more or less spontaneous and/or aperiodic as compared to the other streams of traffic for the application and/or device. Accordingly, traffic may vary according to applications and/or channel rate dynamics.

TWT can be a wake time agreed/negotiated upon by devices (e.g., access points (APs) and/or stations (STAs)), or specified/configured by one device (e.g., an AP). During the wake time, a first device (e.g., a STA) may be in an awake state (e.g., its wireless communication module/interface is in a fully powered-up ready, active or wake state) and is able to transmit and/or receive. When the first device is not awake (e.g., its wireless communication module/interface is in a powered-down, inactive, low power, or sleep state), the first device may enter a low power mode or other sleep mode. The first device may exist in the sleep state until a time instance/window as specified by the TWT.

TWT is a mechanism where a set of service periods (SPs) are defined and shared between devices to reduce/avoid medium contention and improve the power efficiency of the devices. For example, the first device can wake up periodically (e.g., at a fixed, configured time interval/period/cycle) based on the TWT. The TWT approach reduces energy consumption of the devices by limiting the awake time and associated power consumption of the devices.

An AP (e.g., AP and/or other device operating as a soft AP/hotspot) may enhance medium access protection and resource reservation by supporting restricted TWT (R-TWT). The R-TWT service periods (SPs) may be used to deliver latency sensitive traffic and/or any additional frame that supports latency sensitive traffic.

Latency sensitive traffic that is not prioritized (or protected) may degrade user experience. For example, in an AR context, latency between a movement of a user wearing an AR device and an image corresponding to the user movement and displayed to the user using the AR device may cause judder, resulting in motion sickness.

In one implementation, an image of a virtual object is generated by a remote computing device communicatively coupled to the HWD, and the image is rendered by the HWD to conserve computational resources and/or achieve bandwidth efficiency. In one example, the HWD includes various sensors that detect a location and/or orientation of the HWD and a gaze direction of the user wearing the HWD, and transmits sensor measurements indicating the detected location and gaze direction to a console device (and/or a remote server, e.g., in the cloud) through a wired connection or a wireless connection. The console device can determine a user's view of the space of the artificial reality according to the sensor measurements, and generate an image of the space of the artificial reality corresponding to the user's view. The console device can transmit the generated image to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

FIG. 1 is a diagram of a system environment including an artificial reality system, according to an example implementation of the present disclosure. FIG. 1 provides an example environment in which devices may communicate traffic streams with different latency sensitivities/requirements. In some embodiments, the artificial reality system environment 100 includes an access point (AP) 105, one or more head wearable displays (HWD) 150 (e.g., HWD 150A, 150B) worn by a user, and one or more computing devices 110 (computing devices 110A, 110B) providing content of artificial reality to the HWDs 150.

The access point 105 may be a router or any network device allowing one or more computing devices 110 and/or one or more HWDs 150 to access a network (e.g., the Internet). The access point 105 may be replaced by any communication device (cell site). A HWD may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the computing device 110 through a wired or wireless connection. The HWD 150 may also identify objects (e.g., body, hand face).

In some embodiments, the computing devices 110A, 110B communicate with the access point 105 through communication links 102A, 102B (e.g., interlinks), respectively. In some embodiments, the computing device 110A may communicate with the HWD 150A through a communication link 125A (e.g., intralink), and the computing device 110B may communicate with the HWD 150B through a wireless link 125B (e.g., intralink).

The computing device 110 may be a computing device or a mobile device that can retrieve content from the access point 105, and can provide image data of artificial reality to a corresponding HWD 150. Each HWD 150 may present the image of the artificial reality to a user according to the image data.

The computing device 110 may determine a view within the space of the artificial reality corresponding to the detected location, orientation and/or the gaze direction, and generate an image depicting the determined view detected by the HWD 150s. The computing device 110 may also receive one or more user inputs and modify the image according to the user inputs. The computing device 110 may provide the image to the HWD 150 for rendering. The image of the space of the artificial reality corresponding to the user's view can be presented to the user.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the computing device 110 may be performed by the HWD 150, and/or some of the functionality of the HWD 150 may be performed by the computing device 110. In some embodiments, the computing device 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155 (e.g., sensors 155A, 155B) including eye trackers and hand trackers for instance, a communication interface 165 (e.g., communication interface 165A, 165B), an electronic display 175, and a processor 170 (e.g., processor 170A, 170B). These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, hand trackers, eye trackers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the sensors 155 may also include eye trackers with electronic components or a combination of electronic components and software components that determine a gaze direction of the user of the HWD 150. In other embodiments, the eye trackers may be a component separate from sensors 155. In some embodiments, the HWD 150, the computing device 110 or a combination may incorporate the gaze direction of the user of the HWD 150 to generate image data for artificial reality. In some embodiments, the eye trackers (as part of the sensors 155, for instance) include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers may determine that the gaze direction of the user is 20 degrees from the reference direction. In some embodiments, a user of the HWD 150 can configure the HWD 150 (e.g., via user settings) to enable or disable the eye trackers as part of the sensors 155. In some embodiments, a user of the HWD 150 is prompted to enable or disable the eye trackers as part of the sensor 155 configuration.

In some embodiments, the sensors 155 include the hand tracker, which includes an electronic component or a combination of an electronic component and a software component that tracks a hand of the user. In other embodiments, the hand tracker may be a component separate from sensors 155. In some embodiments, the hand tracker includes or is coupled to an imaging sensor (e.g., camera) and an image processor that can detect a shape, a location and/or an orientation of the hand. The hand tracker may generate hand tracking measurements indicating the detected shape, location and/or orientation of the hand.

In some embodiments, the communication interfaces 165 (e.g., communication interface 165A, 165B) of the corresponding HWDs 150 (e.g., HWD 150A, 150B) and/or communication interfaces 115 (e.g., communication interface 115A, 115B) of the corresponding computing devices (e.g., computing device 110A, 110B) include an electronic component or a combination of an electronic component and a software component that is used for communication.

The communication interface 165 may communicate with a communication interface 115 of the computing device 110 through an intralink communication link 125 (e.g., communication link 125A, 125B). The communication interface 165 may transmit to the computing device 110 sensor measurements indicating the determined location of the HWD 150, orientation of the HWD 150, the determined gaze direction of the user, and/or hand tracking measurements. For example, the computing device 110 may receive sensor measurements indicating location and the gaze direction of the user of the HWD 150 and/or hand tracking measurements and provide the image data to the HWD 150 for presentation of the artificial reality, for example, through the wireless link 125 (e.g., intralink). For example, the communication interface 115 may transmit to the HWD 150 data describing an image to be rendered. The communication interface 165 may receive from the computing device 110 sensor measurements indicating or corresponding to an image to be rendered. In some embodiments, the HWD 150 may communicate with the access point 105.

Similarly, the communication interface 115 (e.g., communication interface 115A, 115B) of the computing devices 110 may communicate with the access point 105 through a communication link 102 (e.g., communication link 102A, 102B). In certain embodiments, the computing device 110 may be considered a soft access point (e.g., a hotspot device). Through the communication link 102 (e.g., interlink), the communication interface 115 may transmit and receive from the access point 105 AR/VR content. The communication interface 115 of the computing device 110 may also communicate with communication interface 115 of a different computing device 110 through communication link 185. As described herein, the communication interface 115 may be a counterpart component to the communication interface 165 to communicate with a communication interface 115 of the computing device 110 through a communication link (e.g., USB cable, a wireless link).

The communication interfaces 115 and 165 may receive and/or transmit information indicating a communication link (e.g., channel, timing) between the devices (e.g., between the computing devices 110A and 110B across communication link 185, between the HWD 150A and computing device 110A across communication link 125). According to the information indicating the communication link, the devices may coordinate or schedule operations to avoid interference or collisions.

The communication link may be a wireless link, a wired link, or both. In some embodiments, the communication interface 165/115 includes or is embodied as a transceiver for transmitting and receiving data through a wireless link. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the computing device 110 and the head wearable display 150 are implemented on a single system, the communication interface 165 may communicate with the computing device 110 through a bus connection or a conductive trace.

Using the communication interface, the computing device 110 (or HWD 150, or AP 105) may coordinate operations on links 102, 185 or 125 to reduce collisions or interferences by scheduling communication. For example, the computing device 110 may coordinate communication between the computing device 110 and the HWD 150 using communication link 125. Data (e.g., a traffic stream) may flow in a direction on link 125. For example, the computing device 110 may communicate using a downlink (DL) communication to the HWD 150 and the HWD 150 may communicate using an uplink (UL) communication to the computing device 110. In some implementations, the computing device 110 may transmit a beacon frame periodically to announce/advertise a presence of a wireless link between the computing device 110 and the HWD 150 (or between HWDs 150A and 150B). In an implementation, the HWD 150 may monitor for or receive the beacon frame from the computing device 110, and can schedule communication with the HWD 150 (e.g., using the information in the beacon frame, such as an offset value) to avoid collision or interference with communication between the computing device 110 and/or HWD 150 and other devices.

In some embodiments, the processor 170 may include an image renderer, for instance, which includes an electronic component or a combination of an electronic component and a software component that generates one or more images for display, for example, according to a change in view of the space of the artificial reality. In some embodiments, the image renderer is implemented as processor 170 (or a graphical processing unit (GPU), one or more central processing unit (CPUs), or a combination of them) that executes instructions to perform various functions described herein. In other embodiments, the image renderer may be a component separate from processor 170. The image renderer may receive, through the communication interface 165, data describing an image to be rendered, and render the image through the electronic display 175. In some embodiments, the data from the computing device 110 may be encoded, and the image renderer may decode the data to generate and render the image. In one aspect, the image renderer receives the encoded image from the computing device 110, and decodes the encoded image, such that a communication bandwidth between the computing device 110 and the HWD 150 can be reduced.

In some embodiments, the image renderer receives, from the computing device, 110 additional data including object information indicating virtual objects in the artificial reality space and depth information indicating depth (or distances from the HWD 150) of the virtual objects. Accordingly, the image renderer may receive from the computing device 110 object information and/or depth information. The image renderer may also receive updated sensor measurements from the sensors 155. The process of detecting, by the HWD 150, the location and the orientation of the HWD 150 and/or the gaze direction of the user wearing the HWD 150, and generating and transmitting, by the computing device 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer may generate a small portion (e.g., 10%) of an image corresponding to an updated view within the artificial reality according to the updated sensor measurements, and append the portion to the image in the image data from the computing device 110 through reprojection. The image renderer may perform shading and/or blending on the appended edges. Hence, without recreating the image of the artificial reality according to the updated sensor measurements, the image renderer can generate the image of the artificial reality.

In other implementations, the image renderer generates one or more images through a shading process and a reprojection process when an image from the computing device 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the processor 170 (e.g., image renderer).

In some embodiments, the HWD 150 may include a lens to allow the user to see the display 175 in a close proximity. The lens may be a mechanical component that alters received light from the electronic display 175. The lens may magnify the light from the electronic display 175, and correct for optical error associated with the light. The lens may be a Fresnel lens, a convex lens, a concave lens, a filter, or any suitable optical component that alters the light from the electronic display 175. Through the lens, light from the electronic display 175 can reach the pupils, such that the user can see the image displayed by the electronic display 175, despite the close proximity of the electronic display 175 to the eyes.

In some embodiments, the processor 170 performs compensation to compensate for any distortions or aberrations. In some embodiments, a compensator may be a device separate from the processor 170. The compensator includes an electronic component or a combination of an electronic component and a software component that performs compensation. In one aspect, the lens introduces optical aberrations such as a chromatic aberration, a pin-cushion distortion, barrel distortion, etc. The compensator may determine a compensation (e.g., predistortion) to apply to the image to be rendered from the image renderer to compensate for the distortions caused by the lens, and apply the determined compensation to the image from the image renderer. The compensator may provide the predistorted image to the electronic display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a communication interface 115, a processor 118, and a content provider 130 (e.g., content provider 130A, 130B). These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view.

The processors 118, 170 includes or is embodied as one or more central processing units, graphics processing units, image processors, or any processors for generating images of the artificial reality. In some embodiments, the processors 118, 170 may configure or cause the communication interfaces 115, 165 to toggle, transition, cycle or switch between a sleep mode and a wake up mode. In the wake up mode, the processor 118 may enable the communication interface 115 and the processor 170 may enable the communication interface 165, such that the communication interfaces 115, 165 may exchange data. In the sleep mode, the processor 118 may disable the wireless interface 115 and the processor 170 may disable (e.g., may implement low power or reduced operation in) the communication interface 165, such that the communication interfaces 115, 165 may not consume power, or may reduce power consumption.

The processors 118, 170 may schedule the communication interfaces 115, 165 to switch between the sleep mode and the wake up mode periodically every frame time (e.g., 11 ms or 16 ms). For example, the communication interfaces 115, 165 may operate in the wake up mode for 2 ms of the frame time, and the communication interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced or minimized.

In some embodiments, the processors 118, 170 may configure or cause the communication interfaces 115, 165 to resume communication based on stored information indicating communication between the computing device 110 and the HWD 150. In the wake up mode, the processors 118, 170 may generate and store information (e.g., channel, timing) of the communication between the computing device 110 and the HWD 150. The processors 118, 170 may schedule the communication interfaces 115, 165 to enter a subsequent wake up mode according to timing of the previous communication indicated by the stored information. For example, the communication interfaces 115, 165 may predict/determine when to enter the subsequent wake up mode, according to timing of the previous wake up mode, and can schedule to enter the subsequent wake up mode at the predicted time. After generating and storing the information and scheduling the subsequent wake up mode, the processors 118, 170 may configure or cause the wireless interfaces 115, 165 to enter the sleep mode. When entering the wake up mode, the processors 118, 170 may cause or configure the communication interfaces 115, 165 to resume communication via the channel or frequency band of the previous communication indicated by the stored information. Accordingly, the communication interfaces 115, in 165 entering the wake up mode from the sleep mode may resume communication, while bypassing a scan procedure to search for available channels and/or performing handshake or authentication. Bypassing the scan procedure allows extension of a duration of the communication interfaces 115, 165 operating in the sleep mode, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 20 ft) may coexist and operate with reduced interference.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space. The content provider 130 may encode the image data describing the image, and can transmit the encoded data to the HWD 150. In some embodiments, the content provider generates and provides the image data to the HWD 150 periodically (e.g., every 11 ms or 16 ms).

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

In some embodiments, a scheduler 118 (e.g., scheduler 118A of the computing device 118A and/or scheduler 118B of the computing device 110B) may request R-TWT to transmit latency sensitive traffic using P2P communication. The AP 105 and scheduler 118 of the computing devices 110 may negotiate (e.g., perform a handshake process) and may establish a membership of a restricted TWT schedule. In some embodiments, when the AP 105 and the scheduler 118 are negotiating, the AP 105 may be considered a restricted TWT scheduling AP and the computing devices 110 may be considered a restricted TWT scheduled STA.

In some embodiments, the HWD 150 may request to send P2P traffic to the computing device 110. Accordingly, the HWD 150 may be considered the TWT requesting STA (e.g., the TWT STA that requests the TWT agreement), and the computing device 110 may be considered TWT responding STA (e.g., the TWT STA that respond to the TWT request). The communication link 125 between the computing devices 110 and the HWDs 150 may be a P2P link (e.g., a link used for transmission between two non-AP devices). The communication link 102 between the computing devices 110 and the AP 105 may be any channel or other type of link. In some configurations, the HWD 150 may move/become out of range from the access point 105. In other embodiments, the computing device 110 may request to send P2P traffic to the HWD 150 such that the computing device 110 is considered the TWT requesting STA and the HWD 150 is the TWT responding STA.

The schedulers 118 of the computing devices 110 may schedule communication between the computing device(s) 110 and the HWD(s) 150 with the AP 105 such that the communication between the computing device(s) 110 and HWD(s) 150 is protected. The computing device(s) 110 may initiate such protected P2P communication with the HWD(s) 150 by indicating, to the AP 105, that the computing device(s) 110 wish to schedule P2P communication in R-TWT service periods (SPs). The scheduler 118 of the computing device(s) may schedule (or negotiate) the requested R-TWT SP(s). The scheduler 118 of the computing device(s) may also indicate if the SP(s) are requested only for P2P communication (as compared to mixed P2P communication and non-P2P communication).

Figure 2:
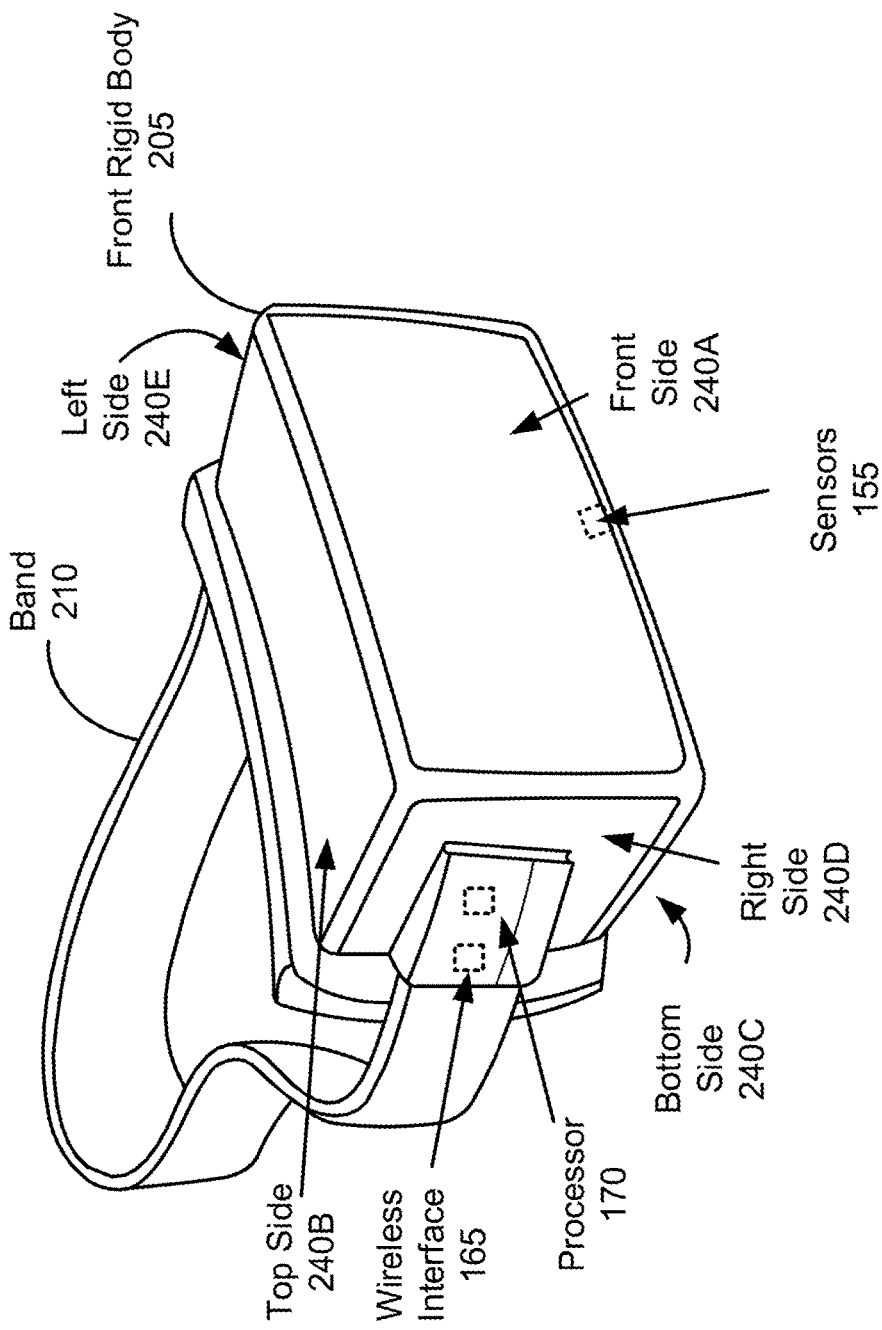
FIG. 2 is a diagram of a head wearable display, according to an example implementation of the present disclosure.

FIG. 2 is a diagram of a head wearable display (HWD) 150, according to an example implementation of the present disclosure. In some embodiments, the HWD 150 includes a front rigid body 205 and a band 210. The front rigid body 205 includes the electronic display 175 (not shown in FIG. 2), the lens (not shown in FIG. 2), the sensors 155, the eye trackers the communication interface 165, and the processor 170. In the embodiment shown by FIG. 2, the sensors 155 are located within the front rigid body 205, and may not visible to the user. In other embodiments, the HWD 150 has a different configuration than shown in FIG. 2. For example, the processor 170, the eye trackers, and/or the sensors 155 may be in different locations than shown in FIG. 2.

Figure 3:
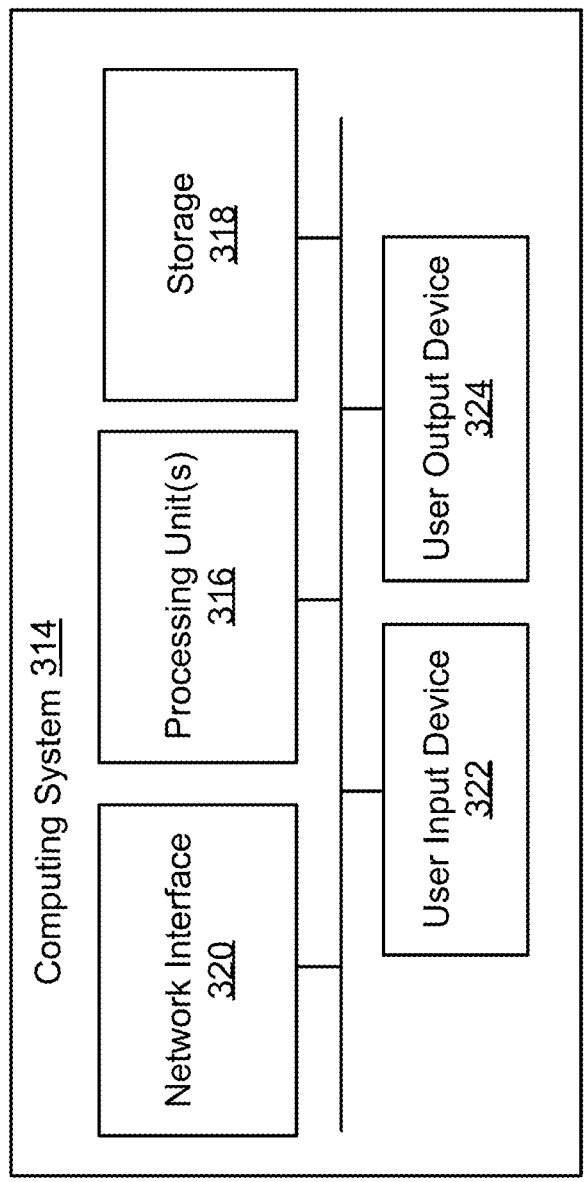
FIG. 3 is a block diagram of a computing environment according to an example implementation of the present disclosure.

FIG. 3 is a block diagram of a computing environment according to an example implementation of the present disclosure. Various operations described herein can be implemented on computer systems. FIG. 3 shows a block diagram of a representative computing system 314 usable to implement the present disclosure. In some embodiments, the computing device 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

FIG. 4 is a timing diagram 400 showing a wake-up/sleep schedule of a computing device utilizing TWT, according to an example implementation of the present disclosure. FIGS. 1-2 illustrate devices that communicate traffic streams some of which may be latency sensitive (e.g., those carrying periodic AR/VR information/content). As described herein, the periodic operation of TWT benefits communication of periodic traffic (e.g., latency sensitive traffic) by predictably communicating the periodic traffic. FIG. 4 is a timing diagram 400 showing a wake-up/sleep schedule of a computing device utilizing TWT, according to an example implementation of the present disclosure. The TWT start time is indicated by the computing device 110 (e.g., a portion of its relevant modules/circuitry) waking up at 402. The computing device 110 may wake up for a duration 404 defined by a SP. After the SP duration 404, the computing device 110 may enter a sleep state until the next TWT start time at 408. The interval of time between TWT start time 402 and TWT start time 408 may be considered the SP interval 406.

A TWT schedule may be communicated and/or negotiated using broadcast TWT (bTWT) and/or individual TWT (iTWT) signaling. In some embodiments, to signal iTWT, TWT schedule information may be communicated to particular (individual) devices using a mode such as a Network Allocation Vector (NAV) to protect the medium access of TWT SPs. In contrast, to signal bTWT, in some embodiments, a device (such as AP 105) may schedule TWT SPs with other devices (e.g., computing devices 110 and/or HWDs 150) and may share schedule information in beacon frames and/or probe response frames. Sharing schedule information using bTWT may reduce overhead (e.g., negotiation overhead) as compared to the overhead used when sharing information using iTWT.

The TWT mechanism may also be used in peer-to-peer (P2P) communication. For example, TWT may be defined for tunneled direct link setup (TDLS) pairs (e.g., non-AP STAs), soft APs (such as computing devices 110) and STAs (such as HWD 150), and/or peer-to-peer group owners (GO) and group clients (GC). For instance, a TDLS pair of devices (e.g., HWD 150 and computing device 110) can request TWT membership for its latency sensitive traffic over a channel. In another example, a group owner (GO), such as a computing device 110, may request TWT membership for latency sensitive traffic over the P2P link.

When P2P communication is established, various channel access rules may govern the P2P communication. An AP assisted P2P trigger frame sequence may reduce the contention/collision associated with TWT (or R-TWT) in P2P communication. Accordingly, a P2P model where a P2P STA (e.g., a HWD 150) is not associated with an infra-basic service set (BSS) AP, may improve P2P communication. Without AP's assistance or coordination, a transmission over the P2P link may collide with another transmission in the BSS. In some embodiments, a reverse direction protocol (RDP) may be enabled for P2P communication. During RDP, when a transmitting STA has obtained a transmit opportunity (TXOP), the transmitting STA may grant permission for the receiving STA to transmit information back to the transmitting STA during the same TXOP. Accordingly, if a TWT setup allows P2P transmission and indicates RDP, the P2P communication can be performed after a triggered frame sequence (e.g., a reverse direction frame exchange). In other embodiments, other protocols may be enabled for P2P communication. In some embodiments, trigger-enabled TWT can reduce the medium contention and/or collisions between UL and DL transmissions. The trigger-enabled TWT may be indicated using a TWT information element (IE).

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 5A:
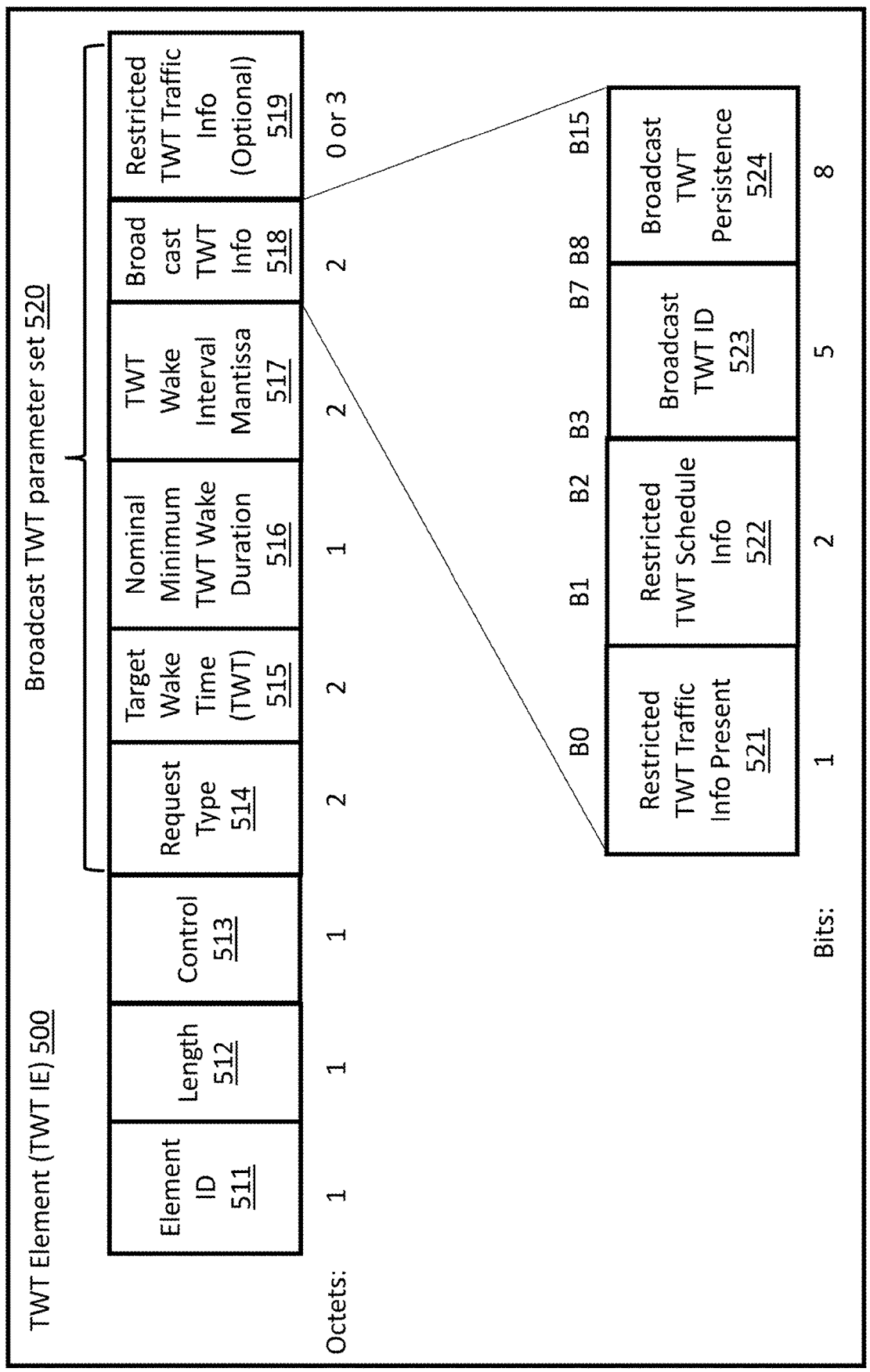
FIG. 5A to FIG. 5C illustrate example format(s) of a target wake time (TWT) element (or TWT information element (IE)), according to example implementations of the present disclosure.
Figure 5B:
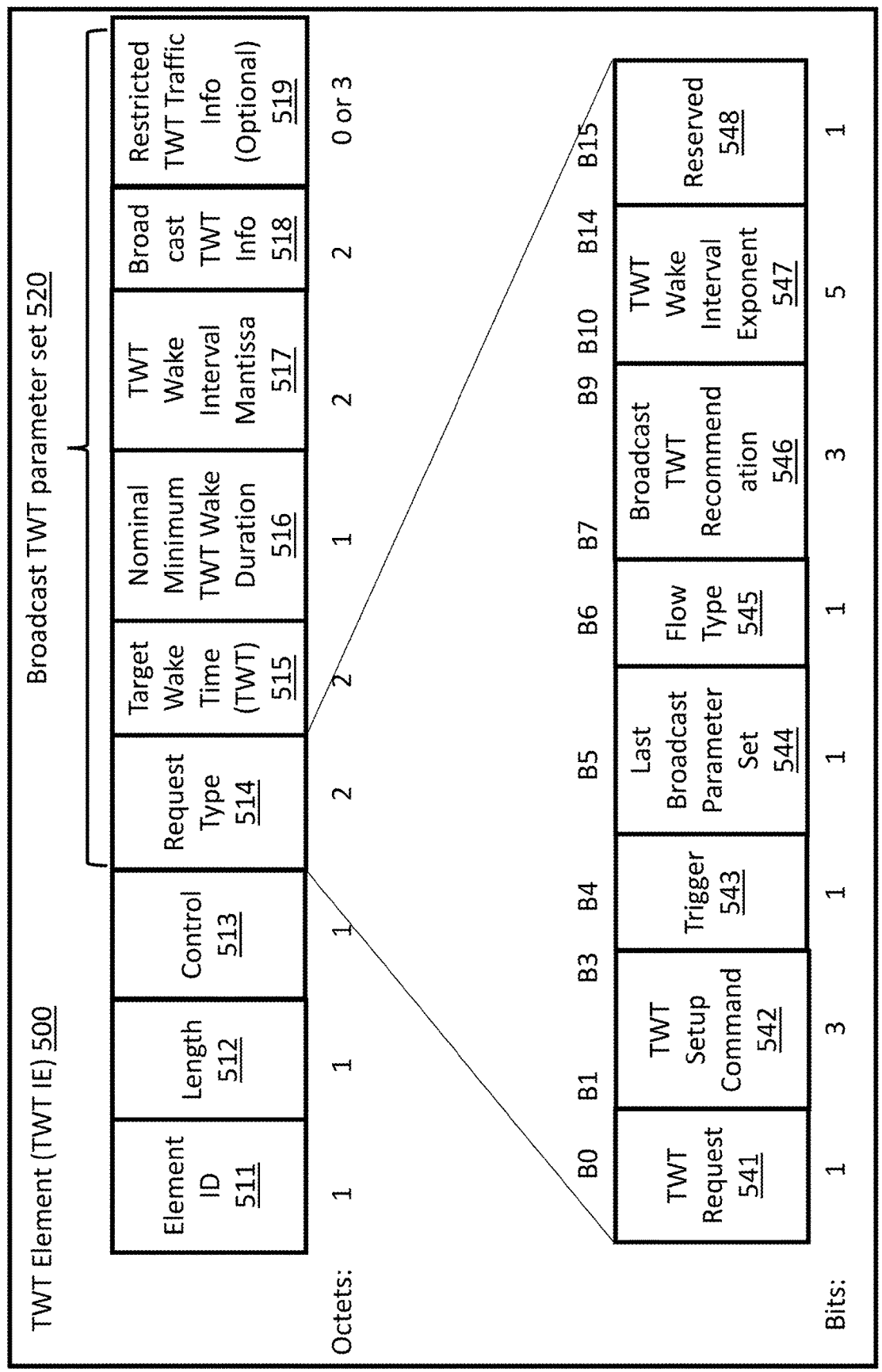
Figure 5C:
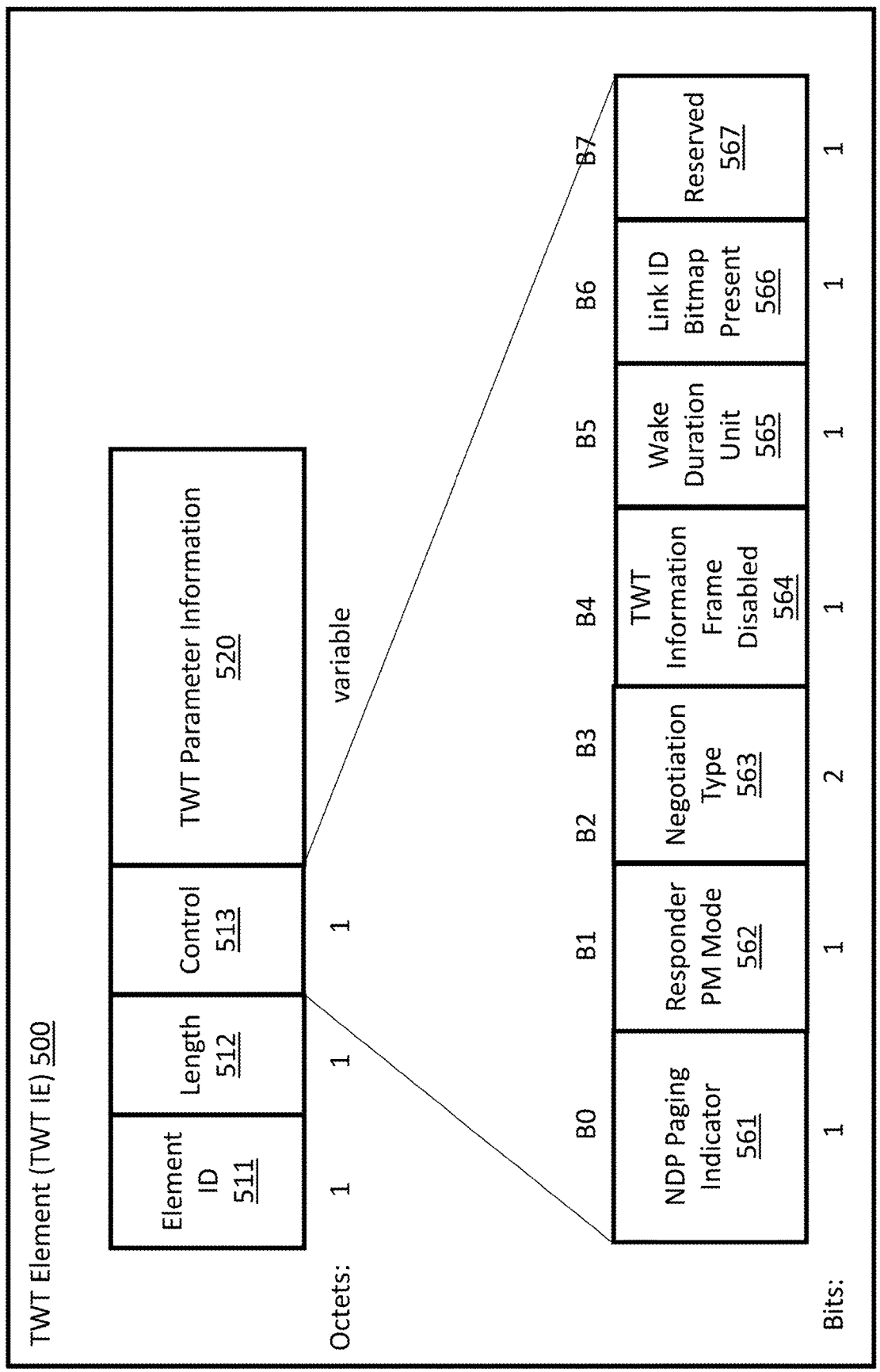

FIG. 5A to FIG. 5C illustrate an example format of a TWT element (or TWT IE) 500, according to an example implementation of the present disclosure. Referring to FIG. 5A, an example format of a TWT element 500 associated with an R-TWT schedule may include the fields of element ID 511, length 512, control 513, request type 514, target wake time 515, nominal minimum TWT wake duration 516, TWT wake interval mantissa 517, broadcast TWT information 518, and/or restricted TWT traffic information 519. The TWT IE 500 may include the field of broadcast TWT parameter set 520 which describes a broadcast TWT schedule and/or an R-TWT schedule. The field of broadcast TWT information 518 may include the subfields of restricted TWT traffic information present 521, restricted TWT schedule information 522, broadcast TWT ID 523, and/or broadcast TWT persistence 524. Referring to FIG. 5B, the field of request type 514 may include the subfields of TWT request 541, TWT setup command 542, trigger 543, last broadcast parameter set 544, flow type 545, broadcast TWT recommendation 546, TWT wake interval exponent 547, and/or reserved 548. Referring to FIG. 5C, the field of control 513 may include the subfields of null data packet (NDP) paging indicator 561, responder power management (PM) mode 562, negotiation type 563, TWT information frame disabled 564, wake duration unit 565, link ID bitmap present 566, and/or reserved 567.

An access point (AP) can create multiple (e.g., two or more) networks on the same Wi-Fi radio to make a single physical AP appear as if it were multiple virtual APs. Multiple BSSIDs as (or belonging/forming to) a multiple BSSID set may be assigned to multiple virtual APs, respectively. In some embodiments, a multiple BSSID element (or multiple BSSID IE) may be included in beacon frames, in DMG (Direction Multi-gigabit) beacon frames, and/or probe response frames. A BSSID of an AP belonging to a multiple BSSID set may be referred to as a transmitted BSSID if the AP includes a multiple BSSID element in a beacon frame that the AP transmits. A BSSID of an AP belonging to a multiple BSSID set may be referred to as a nontransmitted BSSID if/when the AP's BSSID is derived based on information in a multiple BSSID element and/or a multiple BSSID-index element. Among all APs (or AP STAs) in a multiple BSSID set, the AP corresponding to the transmitted BSSID (e.g., only the AP corresponding to the transmitted BSSID) may transmit a beacon frame.

Figure 6:
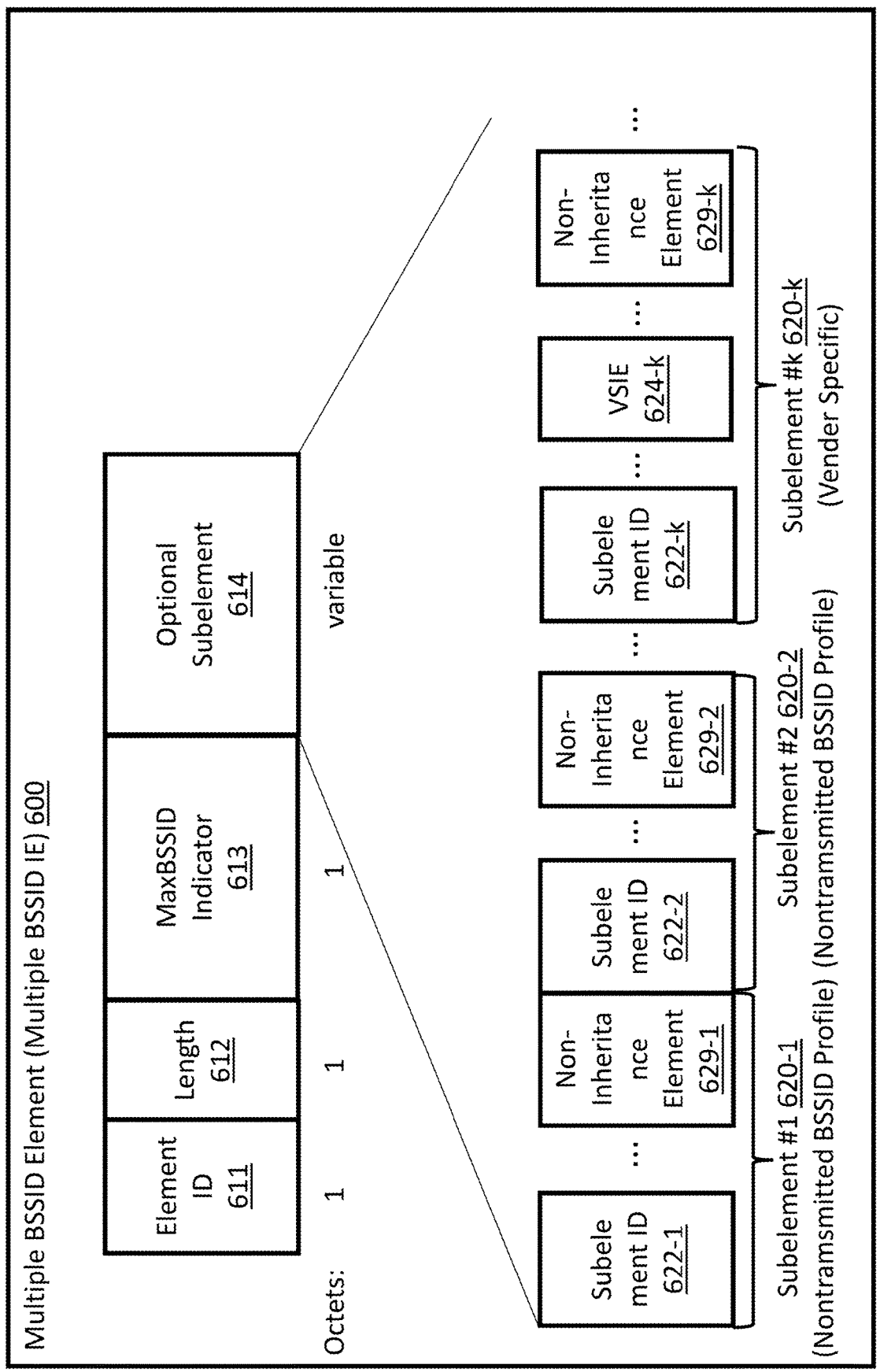
FIG. 6 illustrates an example format of a multiple basic service set identifier (BSSID) element (or multiple BSSID IE), according to an example implementation of the present disclosure.

FIG. 6 illustrates an example format of a multiple BSSID element (or multiple BSSID IE) 600, according to an example implementation of the present disclosure. The multiple BSSID element 600 may include the fields of element ID 611, length 612, MaxBSSID indicator 613, and/or subelement (optional) 614. The field of MaxBSSID indicator 613 may indicate a maximum number of multiple BSSIDs in a multiple BSSID set. The subelement field 614 may include one or more subelements (e.g., subelements 620-1, 620-2, . . . , 620-$k$; k is an integer greater than zero). The fields of each subelement may include subelement ID (e.g., subelement IDs 622-1, 622-2, . . . , 622-$k$), length, etc. As shown in Table 1, there may be two types of subelements: (1) nontransmitted BSSID profile (e.g., with subelement ID=0) and (2) vendor specific (e.g., with subelement ID=221). If the subelement ID of a subelement indicates vender specific (e.g., subelement ID=221), the subelement (e.g., subelement 620-$k$ with subelement ID 622-$k$) may include a vendor-specific information element (VSIE) (e.g., VSIE 624-$k$).

TABLE 1

Optional Subelement IDs for Multiple BSSID

| Subelement ID | Name | Extensible |
| --- | --- | --- |
| 0 | Nontransmitted BSSID Profile | No |
| 1-220 | Reserved | |
| 221 | Vendor Specific | Vendor Defined |
| 222-255 | Reserved | |

In one aspect, if the contents of information fields for specific element IDs (or element ID extension) are the same for a nontransmitted BSSID (or "BSSID N") and the transmitted BSSID, BSSID N may inherit element values of these elements such that these elements may not be carried in a nontransmitted BSSID profile (in the multiple BSSID element) for BSSID N. BSSID N may not inherit element identified by an element ID (or element ID extension), which is referred to as "a non-inheritance element." The non-inheritance element may be listed in the non-inheritance element, which is the last element in the nontransmitted BSSID profile corresponding to BSSID N (e.g., non-inheritance element 629-1, 629-2, . . . , 629-$k$ in FIG. 6). The non-inheritance element may be specific to BSSID N and may be carried in the nontransmitted profile of BSSID N in the multiple BSSID element. Since the content of the information field for the non-inheritance element is not the same for BSSID N and the transmitted BSSID, the element may be carried in the nontransmitted BSSID profile for BSSID N.

I. Multiple BSSID Element for R-TWT

In one aspect, a discovery of a nontransmitted BSSID profile may be performed as follows. An AP or personal BSS control point (PCP) may choose to include a partial list (e.g., only a partial list) of nontransmitted BSSID profiles in a beacon frame, an S1G (sub 1 GHz) beacon frame, or a directional multi-gigabit (DMG) beacon frame, or to include different sets of nontransmitted BSSID profiles in different beacon frames, SiG beacon frames, or DMG beacon frames. In some embodiments, an AP corresponding to the transmitted BSSID may choose to include a partial list (e.g., only a partial list) of nontransmitted BSSID profiles in an unsolicited broadcast probe response frame or a probe response frame sent in response to a probe request frame with an address field (e.g., Address 3 field) set to a wildcard BSSID, and SSID set to one or more wildcard characters.

In one aspect, a nontransmitted BSSID (e.g., a virtual AP having the nontransmitted BSSID) may not transmit a beacon frame. Therefore, the nontransmitted BSSID cannot advertise R-TWT service periods (SPs) of the nontransmitted BSSID in the same manner as the transmitted BSSID does. It would be difficult to (1) announce the start times of SPs of TWT schedules scheduled by the nontransmitted BSSID for R-TWT scheduled STAs; and (2) protect R-TWT SPs of the nontransmitted BSSID from non-AP STAs associated either with the AP corresponding to the transmitted BSSID or with other nontransmitted BSSIDs that are not members of the following R-TWT SPs, and from other APs with non-overlapping R-TWT SPs.

To address these problems and/or benefits, disclosed herein includes systems, devices and methods for advertising and/or announcing an R-TWT schedule (or SPs thereof) using a multiple BSSID element. In some embodiments, a beacon frame carrying a partial list of nontransmitted BSSID profiles transmitted either by an AP or an AP corresponding to a transmitted BSSID can advertise the R-TWT SPs of a schedule of an AP corresponding to a nontransmitted BSSID, if scheduled, in the following beacon interval (BI; e.g., 100 ms). In this manner, the AP can announce the start times of SPs of the nontransmitted BSSID for R-TWT scheduled STAs. The AP can also protect the R-TWT SPs of the nontransmitted BSSID from non-AP STAs associated either with the AP corresponding to the transmitted BSSID or with other nontransmitted BSSIDs that are not members of the following R-TWT SPs of the nontransmitted BSSID, and from other APs with non-overlapping R-TWT SPs.

Figure 7:
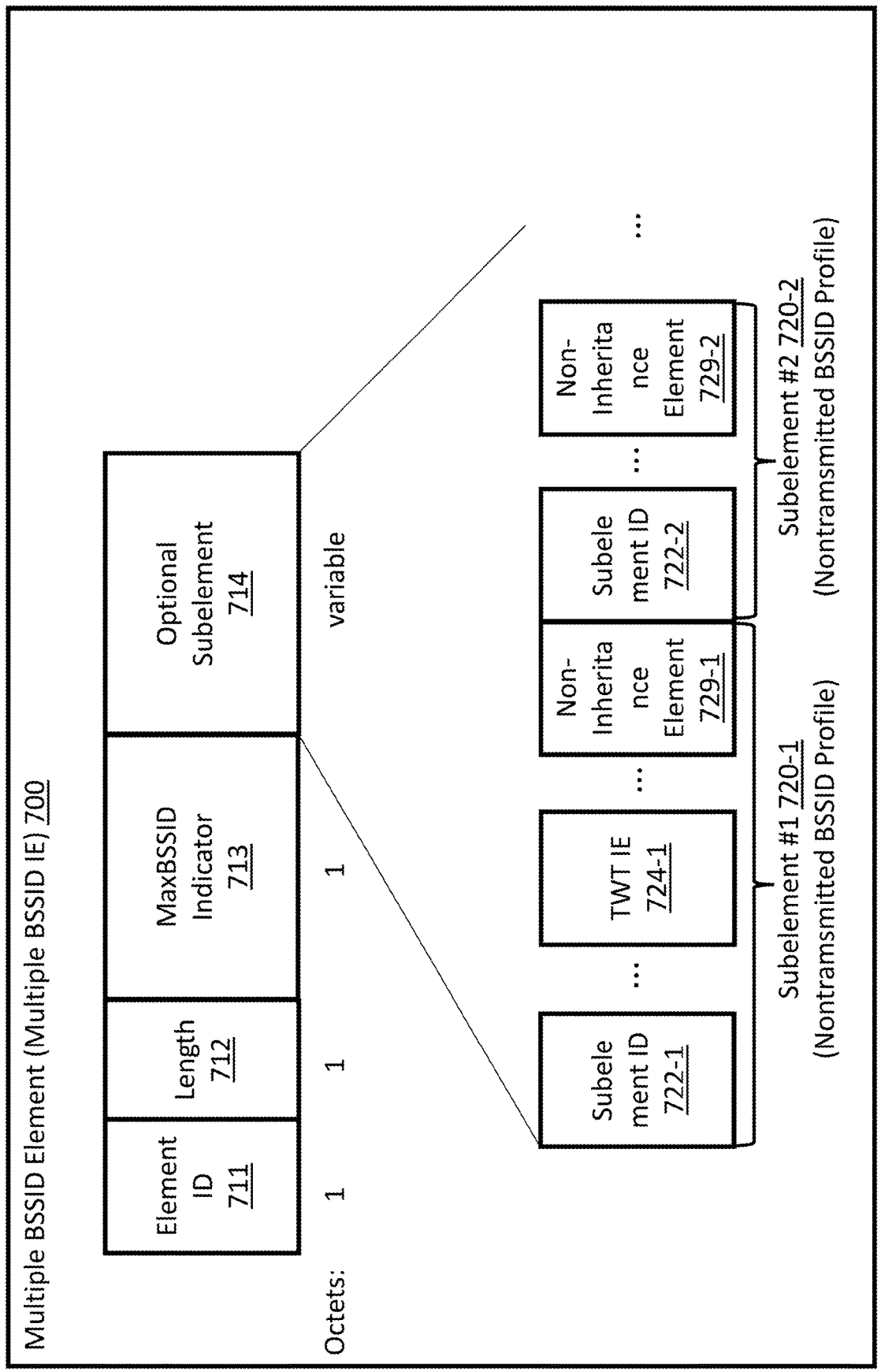
FIG. 7 illustrates another example format of a multiple BSSID element (or multiple BSSID IE), according to an example implementation of the present disclosure.

FIG. 7 illustrates another example format of a multiple BSSID element (or multiple BSSID IE) 700, according to an example implementation of the present disclosure. The multiple BSSID element 700 may include the fields of element ID 711, length 712, MaxBSSID indicator 713, and/or subelement (optional) 714. The field of MaxBSSID indicator 713 may indicate a maximum number of multiple BSSIDs in a multiple BSSID set. The subelement field 714 may include one or more subelements (e.g., subelements 720-1, 720-2, . . . ). The fields of each subelement may include subelement ID (e.g., subelement IDs 722-1, 722-2 both of which are set to 1 indicating nontransmitted BSSID profiles), non-inheritance element (e.g., non-inheritance element 729-1, 729-2), etc. Referring to FIG. 7, in a multiple BSSID element (e.g., multiple BSSID element 700, if the subelement ID of a subelement (e.g., subelement 720-1) indicates a nontransmitted BSSID (e.g., subelement ID 722-1 is set to 0), the subelement 720-1 may include a TWT element (e.g., TWT IE 724-1). In some embodiments, if the subelement ID of a subelement (e.g., subelement 720-2) indicates a nontransmitted BSSID, the subelement (e.g., subelement 720-2) may not include a TWT element and inherit a TWT element outside the multiple BSSID element (e.g., multiple BSSID element 700.

In some embodiments, an AP or an AP corresponding to a transmitted BSSID may include or advertise nontransmitted BSSID profiles of those nontransmitted BSSIDs (e.g., nontransmitted BSSID profiles 720-1, 720-2) in a multiple BSSID element (e.g., multiple BSSID 700) carried in a beacon frame that have scheduled R-TWT SP(s) of those nontransmitted BSSIDs in the following beacon interval.

In some embodiments, if a field of a beacon frame (e.g., the Complete List Of NonTxBSSID Profiles field of Extended Capabilities element) is equal to 0 (which means, for example, the frame carries a partial list or subset of nontransmitted BSSIDs (NonTxBSSID)), an AP or an AP corresponding to a transmitted BSSID may include one or multiple TWT elements (e.g., TWT IE 724-1 in FIG. 7) in a nontransmitted BSSID profile (e.g., nontransmitted BSSID profile 720-1) in a multiple BSSID element (e.g., multiple BSSID element 700) carried in a beacon frame indicating R-TWT SPs scheduled by the nontransmitted BSSID in the following beacon interval.

II. Differentiation Between Transmitted BSSID, Nontransmitted BSSID, and Overlapping BSS (OBSS) AP In one aspect, an AP (referred to as "first AP") can deliver or announce not only TWT schedule information relating to an AP corresponding a transmitted BSSID or a nontransmitted BSSID in a multiple BSSID-based BSS (referred to as "MBSS"), but also TWT schedule information (e.g., R-TWT schedule) of a neighboring AP (referred to as "second AP") in an overlapping BSS (OBSS). From the TWT schedule information of the second AP announced by the first AP, a client device (or STA) associated with the first AP can end transmission before the start of the SP of the announced R-TWT schedule, thereby avoiding interference. In delivering such OBSS TWT schedule information, it would be beneficial to differentiate between the transmitted BSSID, a nontransmitted BSSID, and overlapping BSS (OBSS) AP. Such differentiation can help a STA to determine future R-TWT SPs that could be potentially avoided with current advertised R-TWT service periods (SPs). For example, the STA can make such prediction by utilizing the fact that at any point of time, only one R-TWT SP among an AP corresponding to a transmitted BSSID and other (virtual) APs corresponding to nontransmitted BSSIDs can be operational over a physical link while concurrent R-TWT SP operations may be performed between an OBSS AP and either an AP corresponding to a transmitted BSSID or an AP corresponding to a nontransmitted BSSID.

To address these problems and/or benefits, disclosed herein includes systems, devices and methods for a beacon frame to include an "MBSS/OBSS" field (or subfield) to differentiate in advertised R-TWT SPs among (1) an AP corresponding to a transmitted BSSID within a multiple BSSID set, (2) an AP corresponding to a nontransmitted BSSID within the multiple BSSID set, and (3) an OBSS AP.

Figure 8:
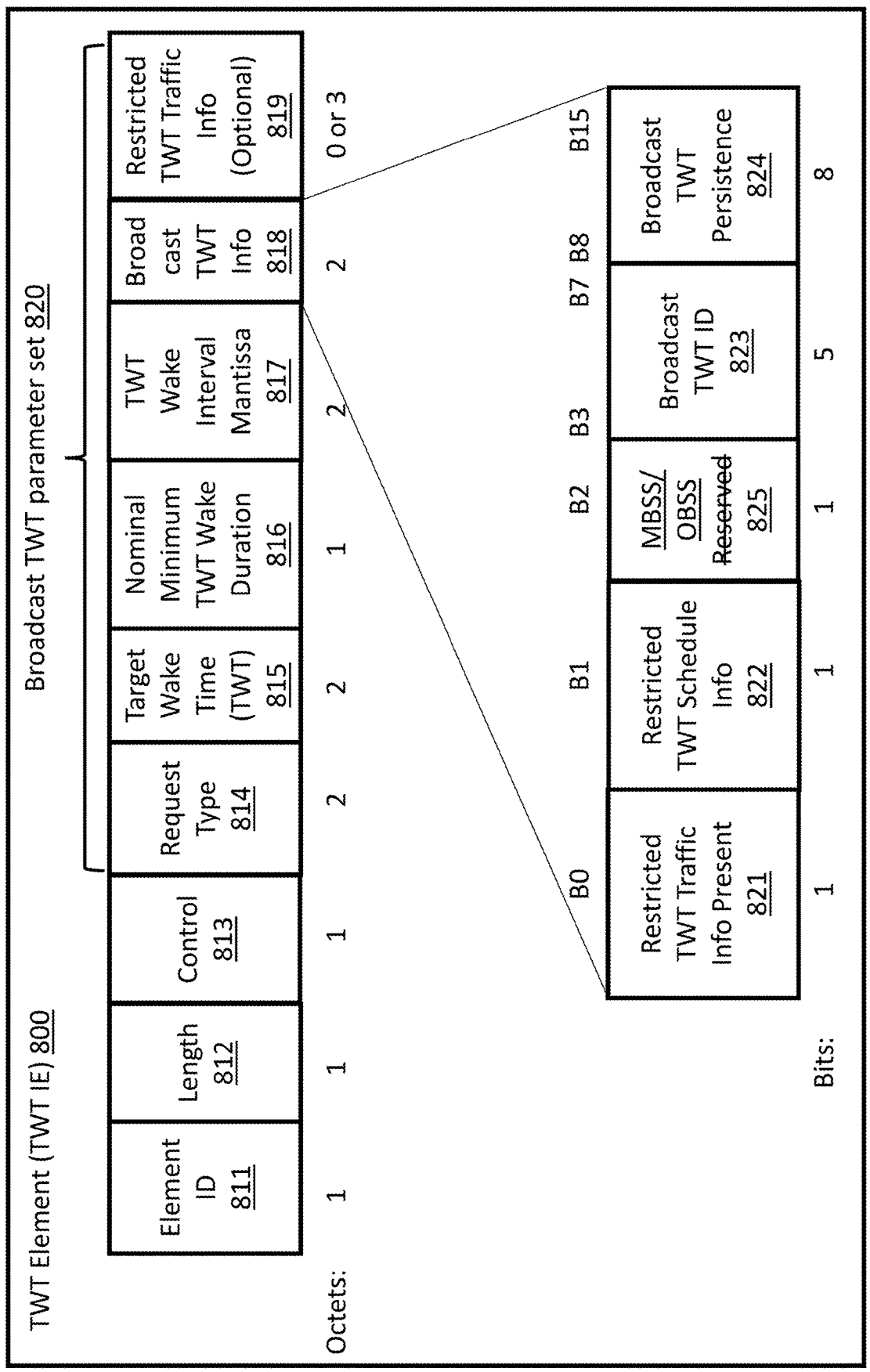
FIG. 8 illustrates an example format of a TWT element (or TWT IE), according to an example implementation of the present disclosure.

In some embodiments, an MBSS/OBSS subfield may be defined to replace a reserved bit in the broadcast TWT information subfield within a broadcast TWT parameter set field. FIG. 8 illustrates an example format of a TWT element (or TWT IE) 800, according to an example implementation of the present disclosure. An example format of a TWT element 800 associated with an R-TWT schedule may include the fields of element ID 811, length 812, control 813, request type 814, target wake time 815, nominal minimum TWT wake duration 816, TWT wake interval mantissa 817, broadcast TWT information 818, and/or restricted TWT traffic information 819. The TWT IE 800 may include the field of broadcast TWT parameter set 820 which describes a broadcast TWT schedule and/or an R-TWT schedule. The field of broadcast TWT information 818 may include the subfields of restricted TWT traffic information present 821, restricted TWT schedule information 822, reserved (e.g., 1 bit) 825, broadcast TWT ID 823, and/or broadcast TWT persistence 824. As shown in FIG. 8, an MBSS/OBSS subfield may be defined to replace the reserved bit 825 in the broadcast TWT information field 818 within the broadcast TWT parameter set field 820.

In some embodiments, a bit (e.g., a reserved subfield) in the field of restricted TWT traffic information (e.g., restricted TWT traffic information 519, 819 in the broadcast TWT parameter set field 520, 820) may be used as an MBSS/OBSS subfield. The MBSS/OBSS subfield may be set to a first value (e.g., "1") to indicate that the R-TWT SP parameters (e.g., parameters defined in the broadcast TWT parameter set field 520, 820) are advertised by an OBSS AP. The MBSS/OBSS subfield may be set to a second value (e.g., "0") to indicate that the R-TWT SP parameters are advertised by an AP corresponding to either a transmitted BSSID or a nontransmitted BSSID in a multiple BSSID set. The values "0" and "1" described above are examples. In some embodiments, the values "0" and "1" may be swapped.

In some embodiments, the reserved subfield or bit (e.g., the reserved bit 825 in the broadcast TWT information subfield 818 or a reserved bit in the R-TWT traffic information subfield 819) can be redefined as "Active" subfield. The "Active" subfield when set to a first value (e.g., "1") may indicate that the R-TWT schedule with SPs thereof has one or more active members that have requested for data exchange. The "Active" subfield when set to a second value (e.g., "0") may indicate that the R-TWT schedule with SPs thereof does not have active members or clients with requested data exchange. In other words, an AP is expected to follow channel access rules, for example, transmission of Trigger frames to member R-TWT STAs in the SPs defined by an active R-TWT schedule. The values "0" and "1" described above are examples. In some embodiments, the values "0" and "1" may be swapped.

In some embodiment, the reserved subfield or bit (e.g., the reserved bit 825 in the broadcast TWT information subfield 818 or a reserved bit in the R-TWT traffic information subfield 819) can be redefined as "Protection" subfield. The "Protection" subfield when set to a first value ("1") may indicate that a transmitter (e.g., network interface 320 in FIG. 3) of this TWT element intends to protect each R-TWT SP with a preceding RTS-CTS frame exchange at the start time of the R-TWT SP. If the "Protection" subfield is set to a second value (e.g., "0"), then the transmitter may intend no protection of the R-TWT SP and hence, an RTS-CTS frame exchange may not be performed. The values "0" and "1" described above are examples. In some embodiments, the values "0" and "1" may be swapped.

In some embodiments, the "Active" subfield or the "Protection" subfield may be used for an R-TWT schedule scheduled by an AP corresponding to a transmitted BSSID. In other words, for a normal BSS other than an MBSS or an OBSS, the reserved subfield or bit (e.g., the reserved bit 825 in the broadcast TWT information subfield 818 or a reserved bit in the R-TWT traffic information subfield 819) may be defined as "Active" field or "Protection" field, while for an MBSS or an OBSS, the reserved subfield or bit may be defined as an MBSS/OBSS subfield.

In some embodiments, if a TWT element is included in a nontransmitted BSSID profile (e.g., nontransmitted BSSID profile 720-1) in a multiple BSSID element (e.g., multiple BSSID element 700), then the MBSS/OBSS subfield in the broadcast TWT information subfield (e.g., broadcast TWT information subfield 518, 818) or the R-TWT traffic information subfield (e.g., R-TWT traffic information subfield 519, 819) may be set to a first value (e.g., "0") to indicate that the R-TWT SP parameters defined in the TWT element (in the nontransmitted BSSID profile) are advertised for a nontransmitted BSSID in a multiple BSSID set. If the TWT element is included in a beacon frame or a probe response frame with the BSSID matching with the BSSID of an AP corresponding to a transmitted BSSID, then the MBSS/OBSS subfield in the broadcast TWT information subfield (or in the R-TWT traffic information subfield) may be set to the first value (e.g., "0") indicating that the R-TWT SP parameters defined in the TWT element (in the beacon frame or the probe response frame) are advertised for the transmitted BSSID in a multiple BSSID set. In other words, the MBSS/OBSS subfield in the broadcast TWT information subfield (or in the R-TWT traffic information subfield) carried in a multiple BSSID element may not be set to a second value ("1"). The values of the MBSS/OBSS subfield described above are examples. The values of "0" and "1" may be swapped. The specific fields and/or subfields described above are merely examples, and may be replaced in some embodiments by other fields and/or subfields to perform the corresponding indicating/indication (e.g., indication of "MBSS/OBSS", "Active", "Protection").

III. TWT Schedule Signaling for Broadcast TWT ID Field

In one aspect, an AP (or a transmitter of the AP) may announce or advertise a TWT schedule scheduled by an AP corresponding to a nontransmitted BSSID or an AP in an OBSS. For example, broadcast TWT (B-TWT) schedules (which may include R-TWT schedules) may be announced via a TWT element with the subfield of negotiation type (e.g., negotiation type subfield 563 in FIG. 5C) set to a particular value (e.g., 2) in the control field of the TWT element (e.g., control field 513 in FIG. 5C). In some embodiments, setting the subfield of negotiation type to 2 may indicate an announcement with information of all TWT schedules. Responsive to receiving the announcement, TWT supporting STAs can learn these schedules so that a STA may request membership in announced schedules, and/or an R-TWT supporting STA may ensure that any transmissions of the STA should end before a start time of any R-TWT SPs. An AP may make TWT schedule announcements via broadcast frames including beacon frames, broadcast probe response frames, and fast initial link setup (FILS) discovery frames.

In one aspect, the broadcast TWT ID subfield (e.g., the broadcast TWT ID subfield 523 in FIG. 5A) of the broadcast TWT information field (e.g., the broadcast TWT information field 518 in FIG. 5A) may be used to indicate an identifier of a broadcast TWT schedule such that each schedule within the same BSS can obtain a unique ID. When the broadcast TWT is a restricted TWT (R-TWT), the broadcast TWT information field (e.g., the broadcast TWT information field 518 in FIG. 5A) may be used to specify information on the R-TWT. For example, the restricted TWT schedule information subfield (e.g., the restricted TWT schedule information subfield 522 of the broadcast TWT information field 518 in FIG. 5A) may be defined as shown Table 1.

TABLE 2

Values of the restricted TWT schedule information subfield

| Value of the restricted TWT schedule information subfield | Description when included in a restricted TWT parameter set field |
| --- | --- |
| 0 | The corresponding R-TWT schedule does not have any member STA or the schedule is suspended for all the member STAs. Such an R-TWT schedule is referred to as an idle R-TWT schedule. |
| 1 | The corresponding R-TWT schedule has at least one member STA for which the schedule is not suspended. Such an R-TWT schedule is referred to as an active R-TWT schedule. |
| 2 | Indicates an active R-TWT schedule for which the R-TWT scheduling AP is unlikely to accept a request from a STA in the BSS to establish a new membership. Such an R-TWT schedule is referred to as a full R-TWT schedule (e.g., the AP might not have sufficient resources within this schedule for accepting new memberships). |
| 3 | Indicates that the advertised R-TWT schedule is active and is for an AP corresponding to a nontransmitted BSSID that is a member of the same multiple BSSID set or co-hosted BSSID set as the AP transmitting the restricted TWT schedule information subfield. |

In one aspect, when the restricted TWT schedule information subfield (e.g., the restricted TWT schedule information subfield 522 in FIG. 5A) is set to 3 (see Table 2) in an announcement management frame (e.g., beacon frame), a receiving STA that sets up R-TWT membership with an AP that is not the one transmitting the announcement management frame, may not know which BSS or AP this schedule is from (or belongs to), as there can be multiple APs in a multiple BSSID set, or a co-hosted BSSID set.

To address these problems and/or benefits, disclosed herein includes systems, devices and methods for identifying a BSS or an AP that a TWT schedule belongs to, using a broadcast TWT ID subfield of the broadcast TWT information field, because when the restricted TWT schedule information subfield is set to 3, the broadcast TWT ID subfield (which is per (AP, STA) pair) may lose its original purpose.

In some embodiments, a field or subfield in a TWT element may be repurposed/appended/modified (as a BSSID subfield or a partial BSSID subfield) to indicate a BSSID of the BSS or AP that a TWT schedule belongs to. In some embodiments, When the restricted TWT schedule information subfield (e.g., restricted TWT schedule information subfield 522 in FIG. 5A) is set to 3, the value in the broadcast TWT ID subfield (e.g., the broadcast TWT ID subfield 523 having 5 bits; see FIG. 5A) may be set to a portion of the BSSID (e.g., 48 bit BSSID) of the AP that the advertised R-TWT schedule is setup with (or belongs to). For example, the broadcast TWT ID subfield may be set to BSSID [43:47] (or any 5 bits portion of the BSSID) of the AP that the advertised R-TWT schedule is setup with (or belongs to). In some embodiments, in the case where the restricted TWT schedule information subfield is set to 3, and the receiving STA that sets up R-TWT membership with an AP that is not the one transmitting the announcement management frame, may not know which BSS/AP this schedule is from or belongs to, the broadcast TWT ID subfield can be renamed to the partial BSSIDs subfield, and/or repurposed as a partial BSSID subfield.

IV. TWT Schedule Signaling for TWT Schedule Identification in an OBSS or Another BSS (ABSS) Other than a BSS of the Transmitted BSSID In one aspect, an "another BSS" ("ABSS") with respect to an AP device (or a "transmitting" AP) refers to any BSS other than a BSS corresponding to the (transmitted) BSSID of the AP device. For example, an ABSS may include (1) an AP corresponding to a nontransmitted BSSID in a multiple BSSID set, (2) an AP corresponding to a nontransmitted BSSID in a co-hosted BSSID set, and/or (3) a neighboring AP in an OBSS. An ABSS TWT schedule (or ABSS schedule) refers to a TWT schedule scheduled by an AP in an ABSS (e.g., scheduled by either an AP corresponding to a nontransmitted BSSID in a multiple BSSID set or a co-hosted BSSID set, or an AP in an OBSS). When the AP (corresponding to the transmitted BSSID) announce or advertise an ABSS schedule using a TWT element in an announcement management frame (e.g., beacon frame), some fields/subfields in a TWT element may not be meaningful any more, losing their originally functionality. Therefore, a receiving STA may not obtain sufficient information on the announced TWT schedule or an ABSS that the schedule belongs to.

To address these problems and/or benefits, disclosed herein includes systems, devices and methods for obtaining sufficient information, or defining new functionalities, on an ABSS or an ABSS TWT schedule when an AP device announce or advertise the ABSS TWT schedule. In some embodiments, new functionalities on an ABSS or an ABSS TWT schedule may be defined using fields or subfields that may lose their original purpose when the ABSS schedule is announced. When a TWT schedule is indicated as belonging to an ABSS, several other fields and subfields in the TWT element may become irrelevant for the schedule and may be declared as reserved, or can be redefined or reinterpreted to convey alternate information specifically for the ABSS schedule. Indication or identification of an ABSS in advertising ABSS schedules can be used by APs and STAs thereby (1) protecting a start time of an R-TWT schedule, (2) reducing interference and enhancing transmission performance, and/or (3) allowing a transmitting AP to advertise a TWT schedule of a non-transmitting AP (e.g., virtual AP).

In some embodiments, a device (e.g., a transmitting AP) may indicate whether a TWT (R-TWT) schedule belongs to the AP's own BSS or an ABSS using a restricted TWT schedule information field in a TWT element (e.g., restricted TWT schedule information subfield 522 in the TWT element 500 in FIG. 5A). In some cases, a BSSID of an ABSS may be long (e.g., 48 bits) and may not be included a TWT element.

In some embodiments, an ABSS may be indicated in TWT schedule announcements. For example, such ABSS indication may be a part of the broadcast TWT parameter set field (see broadcast TWT parameter set field 520) such that each schedule may be described by its own parameter set included in a TWT element. The ABSS indication may be carried in a broadcast TWT information subfield (e.g., broadcast TWT information subfield 518) using a restricted TWT schedule information subfield (e.g., restricted TWT schedule information subfield 522). Referring to FIG. 5A, a particular combination of bits B1 and B2 of the restricted TWT schedule information subfield 522 may be indicated as "ABSS". In some embodiments, a particular combination of bits B1 and B2 of the restricted TWT schedule information subfield 522 may be indicated as a category of the "ABSS", such as (1) a BSS of a nontransmitted BSSID in a multiple BSSID set, (2) a BSS of a nontransmitted BSSID in a co-hosted BSSID set, or (3) OBSS.

In one approach, a broadcast TWT ID subfield (e.g., broadcast TWT ID subfield 523) in a TWT element may indicate an identifier associated with an ABSS. The broadcast TWT ID subfield may be used as an identifier of a broadcast TWT (B-TWT) schedule (e.g., B-TWT or R-TWT) such that each schedule within the BSS (corresponding to the transmitting AP) may get a unique ID. In some embodiments, a broadcast TWT ID subfield (e.g., broadcast TWT ID subfield 523) may be present in a broadcast TWT information field (e.g., broadcast TWT information field 518) of a TWT element (e.g., TWT element 500), but in some other embodiments, other frames/fields (which are different from a TWT element or different from broadcast TWT information field) may also include a broadcast TWT ID subfield.

In some cases, it is difficult or is not possible to uniquely identify an ABSS broadcast TWT (B-TWT) schedule by the broadcast TWT ID field alone due to lack of information on the ABSS (e.g., lack of BSSID of the ABSS in the current TWT element). For example, (1) since two B-TWT schedules within a BSS cannot have the same ID, B-TWT IDs may not be repeated within B-TWT schedule announcements; (2) other B-TWT related signaling may refer to schedule information in the TWT element, and the "link" or "reference point" may be the B-TWT ID; and (3) when advertising a schedule as ABSS (e.g., OBSS), broadcast TWT ID may have duplicate values depending on the ID of the ABSS schedule (e.g., OBSS schedule). For at least the foregoing reasons, it is difficult or is not possible to uniquely identify an ABSS B-TWT schedule by the broadcast TWT ID field alone. In some cases, it would be preferable/beneficial to identify an ABSS uniquely.

In some embodiments, the broadcast TWT ID field (e.g., broadcast TWT ID field 523 in the TWT element 500 or other frames/fields) may be interpreted differently when the schedule is indicated as ABSS. For example, there may be three interpretation options as follows. (1) In some embodiments, when the broadcast TWT information field (e.g., broadcast TWT information field 518) of an advertised B-TWT schedule indicates an ABSS, the broadcast TWT ID subfield in the TWT element (e.g., broadcast TWT ID field 523) may be interpreted/repurposed/redefined as an "order" subfield for arrangement or reference of corresponding schedules from the ABSS (e.g., an order or a sequence number of schedules from an OBSS). (2) In some embodiments, when the broadcast TWT information field of an advertised B-TWT schedule indicates ABSS, the broadcast TWT ID subfield in the TWT element may be reserved. (3) In some embodiments, when the broadcast TWT information field of an advertised B-TWT schedule indicates ABSS (e.g., OBSS), the broadcast TWT ID subfield in the TWT element may indicate an "ABSS ID" (e.g., OBSS ID) to attach a qualifier for which ABSS (e.g., OBSS) this schedule belongs to. In some embodiments, the "ABSS ID" (e.g., OBSS ID) may be signaled elsewhere in TWT signaling as well (e.g., a value in a broadcast TWT persistence subfield may be interpreted/repurposed/redefined as an OBSS ID) and a value in the broadcast TWT ID subfield may be used to correlate information about this ABSS schedule in the TWT element to the information on the "ABSS ID" being signaled elsewhere.

In some embodiments, a broadcast TWT persistence subfield in a TWT element (e.g., broadcast TWT persistence subfield 524 in the TWT element 500) may indicate an identifier associated with the ABSS (e.g., OBSS). When a transmitting AP advertises a particular B-TWT schedule of the transmitting AP, the broadcast TWT persistence subfield (e.g., broadcast TWT persistence subfield 524), present next to the broadcast TWT ID subfield (e.g., broadcast TWT ID subfield 523) in the broadcast TWT information field (e.g., broadcast TWT information field 518), may indicate how long (in units of "beacon intervals") the B-TWT schedule will/may persist/continue to exist. In some cases, the broadcast TWT persistence subfield may not be used when advertising ABSS schedules. In some embodiments, the broadcast TWT persistence subfield may be interpreted differently when the schedule is indicated as ABSS (e.g., OBSS). For example, there may be two interpretation options as follows. (1) In some embodiments, when the broadcast TWT information field of an advertised B-TWT schedule indicates ABSS, the broadcast TWT persistence subfield in the TWT element may be reserved. (2) In some embodiments, when the broadcast TWT information field of an advertised B-TWT schedule indicates ABSS (e.g., OBSS), 8 bits of the broadcast TWT persistence subfield (see FIG. 5A) may be merged with 5 bits of the broadcast TWT ID subfield (see FIG. 5A) to define a combination of "order" (from the broadcast TWT ID subfield as described above) and "ABSS ID" (from the broadcast TWT persistence subfield). In some embodiments, the 8 bits of the broadcast TWT persistence subfield may be set to a portion of BSSID of the ABSS (e.g., BSSID [40:47] (or any 8 bits portion of the BSSID) of an OBSS).

In some embodiments, a broadcast TWT recommendation subfield (e.g., broadcast TWT recommendation subfield 546 of the request type field 514 in FIG. 5B) in a TWT element (e.g., TWT element 500 in FIG. 5B) may indicate an identifier associated with the ABSS (e.g., OBSS). The broadcast TWT recommendation subfield may convey information about schedules within the BSS, about management of schedules and/or how to exchange frames within those schedules. For example, when a transmitting AP advertises a TWT schedule of the transmitting AP, the broadcast TWT recommendation subfield may indicate one or more types of frames that are transmitted during a TWT service period of the TWT schedule. In some embodiments, the broadcast TWT recommendation subfield may be redefined/repurposed when the schedule indicates ABSS (e.g., OBSS). For example, there may be two interpretation options as follows. (1) In some embodiments, when the broadcast TWT information field of an advertised B-TWT schedule indicates ABSS, the broadcast TWT recommendation subfield in the TWT element may be reserved. (2) In some embodiments, when the broadcast TWT information field of an advertised B-TWT schedule indicates ABSS, the broadcast TWT recommendation subfield may be redefined/repurposed to carry other information (e.g., an order of a schedule and/or an OBSS ID) about the ABSS schedules (e.g., OBSS schedules).

In some embodiments, a TWT setup command subfield (e.g., TWT setup command subfield 542 of the request type field 514 in FIG. 5B) in a TWT element (e.g., TWT element 500 in FIG. 5B) may indicate an identifier associated with the ABSS (e.g., OBSS). The TWT setup command subfield may convey information about schedules within the BSS, about management of schedules and/or how to exchange frames within those schedules. For example, when a transmitting AP advertises a TWT schedule of the transmitting AP, the TWT setup command subfield may indicate a type of a message to set up a TWT session of the TWT schedule. In some embodiments, the TWT setup command subfield may be redefined/repurposed when the schedule indicates ABSS (e.g., OBSS). For example, there may be two interpretation options as follows. (1) In some embodiments, when the broadcast TWT information field of an advertised B-TWT schedule indicates ABSS, the TWT setup command subfield in the TWT element may be reserved. (2) In some embodiments, when the broadcast TWT information field of an advertised B-TWT schedule indicates ABSS, the TWT setup command subfield may be redefined/repurposed to carry other information (e.g., an order of a schedule and/or an OBSS ID) about the ABSS schedules (e.g., OBSS schedules).

Embodiments in the present disclosure have at least the following advantages and benefits.

First, embodiments in the present disclosure can provide useful techniques for announcing/delivering/providing/advertising an R-TWT schedule (or SPs thereof) using a multiple BSSID element. In some embodiments, a beacon frame carrying a partial list of nontransmitted BSSID profiles transmitted either by an AP or an AP corresponding to a transmitted BSSID can advertise the R-TWT SPs of a schedule of an AP corresponding to a nontransmitted BSSID, if scheduled, in the following beacon interval. In this manner, the AP can announce the start times of SPs of the nontransmitted BSSID for R-TWT scheduled STAs. The AP can also protect the R-TWT SPs of the nontransmitted BSSID from non-AP STAs associated either with the AP corresponding to the transmitted BSSID or with other nontransmitted BSSIDs that are not members of the following R-TWT SPs of the nontransmitted BSSID, and from other APs with non-overlapping R-TWT SPs.

Second, embodiments in the present disclosure can provide useful techniques for a frame (e.g., beacon frame) to include an "MBSS/OBSS" field (or subfield) to differentiate in advertised R-TWT SPs among (1) an AP corresponding to a transmitted BSSID within a multiple BSSID set, (2) an AP corresponding to a nontransmitted BSSID within the multiple BSSID set, and (3) an OBSS AP. Such differentiation can help a STA to determine future/possible R-TWT SPs that could be potentially avoided with current advertised R-TWT service periods (SPs). For example, the STA can make such prediction by utilizing the fact that at any point of time, only one R-TWT SP among an AP corresponding to a transmitted BSSID and other (virtual) APs corresponding to nontransmitted BSSIDs can be operational over a physical link while concurrent R-TWT SP operations may be performed between an OBSS AP and either an AP corresponding to a transmitted BSSID or an AP corresponding to a nontransmitted BSSID.

Third, embodiments in the present disclosure can provide useful techniques for identifying a BSS or an AP that a TWT schedule belongs to using a broadcast TWT ID subfield of the broadcast TWT information field because when the restricted TWT schedule information subfield is set to 3, the broadcast TWT ID subfield may lose its original purpose. For example, when the restricted TWT schedule information subfield (e.g., the restricted TWT schedule information subfield 522 in FIG. 5A) is set to 3 (see Table 2) in an announcement management frame (e.g., beacon frame), a receiving STA that sets up R-TWT membership with an AP that is not the one transmitting the announcement management frame, can identify which BSS or AP this schedule is from (or belongs to), using a broadcast TWT ID subfield of the broadcast TWT information field.

Fourth, embodiments in the present disclosure can provide useful techniques for obtaining sufficient information, or defining new functionalities, on an ABSS or an ABSS TWT schedule when an AP device announce or advertise the ABSS TWT schedule. In some embodiments, new functionalities on an ABSS or an ABSS TWT schedule can be defined using fields or subfields that may lose their original purpose when the ABSS schedule is announced. Indication or identification of an ABSS in advertising ABSS schedules can be used by APs and STAs thereby (1) protecting a start time of an R-TWT schedule, (2) reducing interference and enhancing transmission performance, and/or (3) allowing a transmitting AP to advertise a TWT schedule of a non-transmitting AP (e.g., virtual AP).

Figure 9:
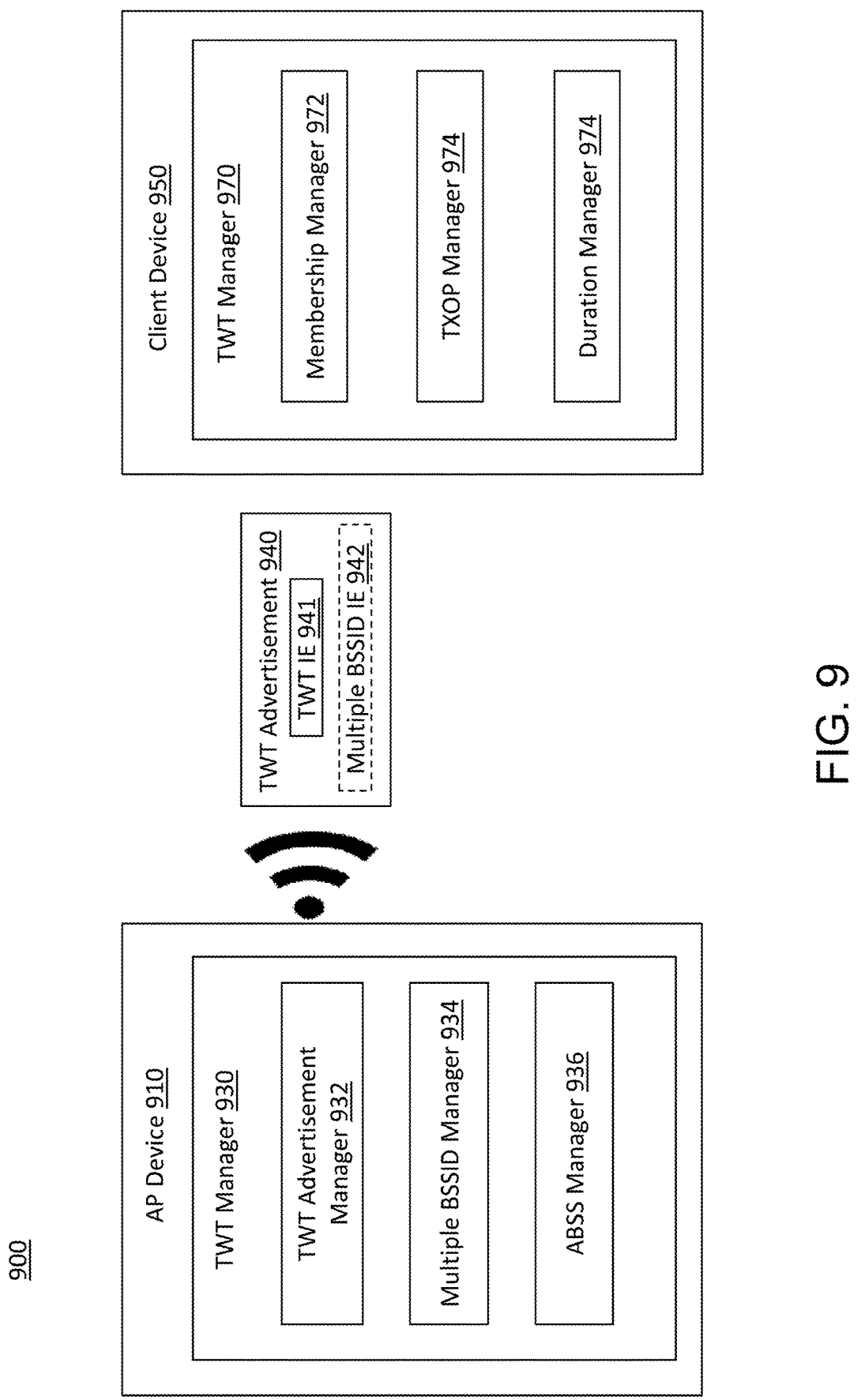
FIG. 9 is a block diagram of a system environment in which a client device and an AP communicate data relating to an R-TWT schedule, according to an example implementation of the present disclosure.

FIG. 9 is a block diagram of a system environment in which a client device 950 and an AP device 910 communicate data relating to an R-TWT schedule, according to an example implementation of the present disclosure. In some embodiments, the AP device 910 may be an AP (e.g., AP device 105), a soft AP or a computing device (e.g., computing system 314) in a WLAN. The AP device 910 may include a TWT manager 930. The TWT manager 930 includes an electronic component or a combination of an electronic component and a software component. The TWT manager 930 may include a TWT advertisement manager 932, a multiple BSSID manager 934, and/or an ABSS manager 936. The TWT manager 930 may be configured to (1) announce/deliver/provide/advertise an R-TWT schedule (or SPs thereof) using a multiple BSSID element; (2) include an "MBSS/OBSS" field (or subfield) to differentiate in advertised R-TWT SPs among an AP corresponding to a transmitted BSSID within a multiple BSSID set, an AP corresponding to a nontransmitted BSSID within the multiple BSSID set, and an OBSS AP; (3) identify a BSS or an AP that a TWT schedule belongs to using a broadcast TWT ID subfield of the broadcast TWT information field; and/or (4) obtain sufficient information, or define new functionalities, on an ABSS or an ABSS TWT schedule when an AP device announce or advertise the ABSS TWT schedule. The TWT advertisement manager 932 may be configured to generate and send or broadcast an advertisement frame 940. For example, the advertisement frame 940 may be a beacon frame or other management frame such as probe request/ response, association/disassociation, etc.). The advertisement frame 940 may include a TWT element (or TWT IE) 941. For example, the TWT IE 941 may have the same structure as that of TWT IE 500 as shown in FIG. 5A to FIG. 5C or that of TWT IE 800 as shown in FIG. 8. The advertisement frame 940 may include a multiple BSSID element (or multiple BSSID IE) 942. For example, the multiple BSSID IE 942 may have the same structure as that of multiple BSSID IE 600 or multiple BSSID IE 700 as shown in FIG. 6 and FIG. 7. The multiple BSSID manager 934 may be configured to announce/deliver/provide/advertise an R-TWT schedule (or SPs thereof) using a multiple BSSID element. The ABSS manager 936 may be configured to (1) include an "MBSS/OBSS" field (or subfield) to differentiate in advertised R-TWT SPs among an AP corresponding to a transmitted BSSID within a multiple BSSID set, an AP corresponding to a nontransmitted BSSID within the multiple BSSID set, and an OBSS AP; (2) identify a BSS or an AP that a TWT schedule belongs to using a broadcast TWT ID subfield of the broadcast TWT information field; and/or (3) obtain sufficient information, or define new functionalities, on an ABSS or an ABSS TWT schedule when an AP device announce or advertise the ABSS TWT schedule.

In some embodiments, the client device 950 may be a non-AP STA (e.g., device 110A, 110B), a HWD (e.g., HWD 150A, 150B), or a computing device (e.g., computing system 314). The client device 950 may include a TWT manager 970. The TWT manager 970 includes an electronic component or a combination of an electronic component and a software component. The TWT manager 970 may include a membership manager 972, a TXOP manager 974, and/or a duration manager 976. The TWT manager 970 may be configured to (1) receive an advertisement frame (e.g., advertisement frame 940) associated with a particular R-TWT schedule from the AP device 910, and (2) perform various TWT operations with respect to the particular R-TWT schedule (e.g., request for a new R-TWT membership, manage timings of TXOP, request to increase a schedule duration, etc.) based on restricted TWT schedule information contained in the TWT IE of the advertisement frame (e.g., fields or subfields of the TWT IE 941) or the multiple BSSID IE of the advertisement frame (e.g., fields or subfields of the multiple BSSID IE 942). The membership manager 972 may be configured to (1) determine, based on the restricted TWT schedule information of the particular R-TWT schedule contained in the advertisement frame 940, whether the client device 950 sends a request for a new membership of the particular R-TWT schedule, and (2) send the request based on the determination. The TXOP manager 974 may be configured to determine timings of TXOP (of the client device 950) based on the restricted TWT schedule information of the particular R-TWT schedule contained in the advertisement frame 940. For example, the TXOP manager 974 may learn/determined, from the advertisement frame 940, information on TWT schedules so that the client device 950 may request membership in announced schedules, and/or ensure that any transmissions of the client device 950 should end before a start time of any R-TWT SPs of the TWT schedules. The duration manager 976 may be configured to determine whether to send a request to increase a schedule duration, based on the restricted TWT schedule information of the particular R-TWT schedule contained in the advertisement frame 940.

Figure 10:
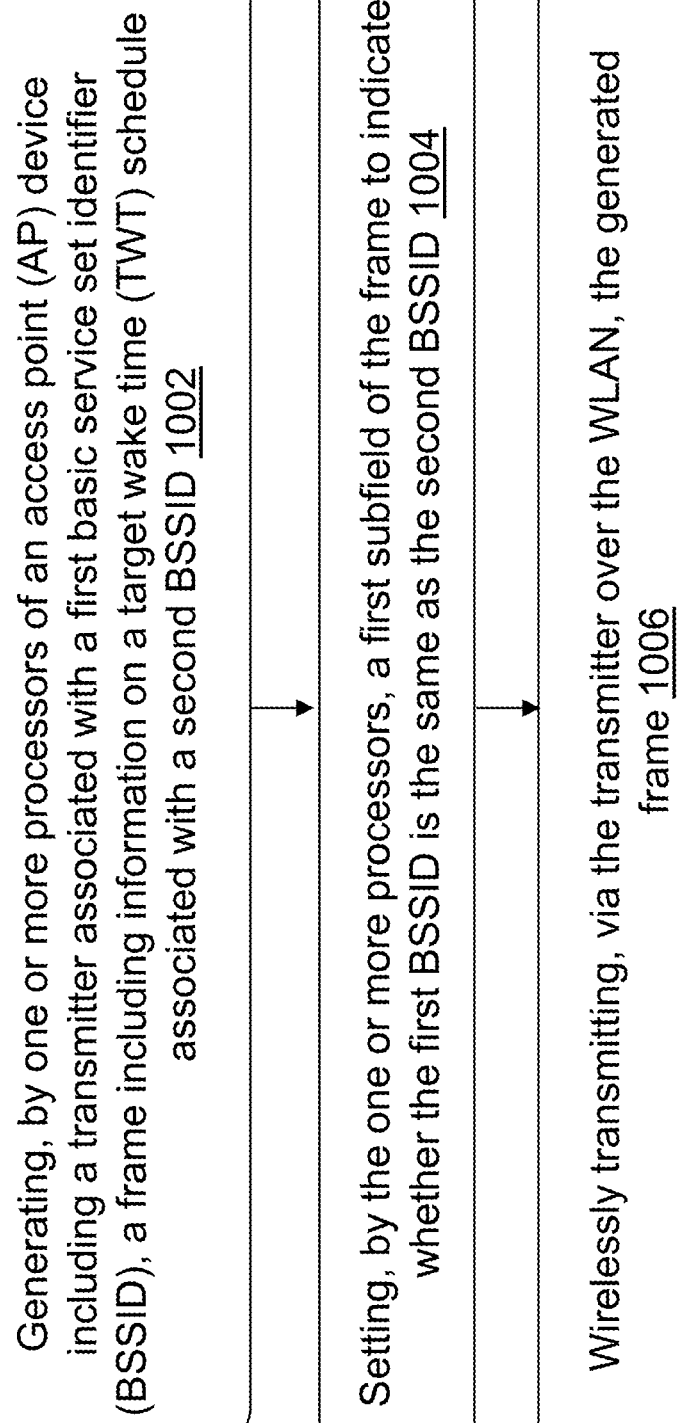
FIG. 10 is a flowchart showing a process of announcing TWT schedules for a multiple BSSID set, according to an example implementation of the present disclosure.

FIG. 10 is a flowchart showing a process 1000 of announcing TWT schedules for a multiple BSSID set, according to an example implementation of the present disclosure. In some embodiments, the process 1000 is performed by an AP device (e.g., an AP 105) including one or more processors (e.g., processors 316 in FIG. 3) and a transmitter (e.g., network interface 320) associated with a first BSSID (e.g., BSSID corresponding to the AP device or a transmitting AP). In some embodiments, the process 1000 is performed by other entities. In some embodiments, the process 1000 includes more, fewer, or different steps than shown in FIG. 10.

In one approach, the AP device may generate 1002 a frame (e.g., TWT advertisement frame 940, beacon frame, or probe response frame) including information on a target wake time (TWT) schedule associated with a second BSSID (e.g., BSSID corresponding to the transmitting AP, BSSID corresponding to a nontransmitted BSSID in a multiple BSSID set or in a co-hosted BSSID set, or BSSID corresponding to an OBSS). In some embodiments, the TWT schedule may be a restricted TWT (R-TWT) schedule. The frame is a beacon frame or a probe response frame. The first BSSID and the second BSSID may be different from each other and may be included in a co-hosted BSSID set.

In some embodiments, the first BSSID (e.g., a transmitted BSSID) and the second BSSID (e.g., a nontransmitted BSSID) may be different from each other and are included in a multiple BSSID set. The information on the TWT schedule associated with the second BSSID may include information on a start time of a TWT service period of the TWT schedule. The frame may include a multiple BSSID element (e.g., multiple BSSID element 600, 700).

The information on the TWT schedule associated with the second BSSID (e.g., a nontransmitted BSSID) may be included in a TWT element outside the multiple BSSID element. For example, the nontransmitted BSSID may inherit element values of elements (e.g., TWT element) such that the elements may not be carried in a nontransmitted BSSID profile (e.g., the nontransmitted BSSID profile 720-2 does not carry a TWT IE and may inherit the TWT IE from a TWT IE outside the multiple BSSID element 700. The information on the TWT schedule associated with the second BSSID may be included in a TWT element (e.g., TWT IE 724-1) in the multiple BSSID element (e.g., multiple BSSID element 700). The TWT schedule may be a restricted TWT (R-TWT) schedule. The frame is a beacon frame or a probe response frame. The first BSSID and the second BSSID may be different from each other and may be included in a co-hosted BSSID set.

In one approach, the AP device may set 1004 a first subfield of the frame (e.g., restricted TWT schedule information field 522) to indicate whether the first BSSID is the same as the second BSSID (e.g., whether the second BSSID is a transmitted BSSID or a nontransmitted BSSID).

In some embodiments, responsive to the first subfield of the frame indicating that the first BSSID is the same as the second BSSID (e.g., the second BSSID is the transmitted BSSID), the one or more processors may set a second subfield of the frame (e.g., broadcast TWT ID subfield 523) to indicate a TWT identifier of the TWT schedule. Responsive to the first subfield of the frame indicating that the first BSSID is not the same as the second BSSID (e.g., the second BSSID is a nontransmitted BSSID), the one or more processors may set the second subfield of the frame to indicate at least a portion of the second BSSID (e.g., BSSID [43:47] (or any 5 bits portion of the BSSID) of the AP corresponding to the nontransmitted BSSID).

In some embodiments, responsive to the first subfield of the frame indicating that the first BSSID is the same as the second BSSID (e.g., the second BSSID is the transmitted BSSID), the one or more processors may set the first subfield of the frame (e.g., restricted TWT schedule information field 522) to one of a first value, a second value or a third value. The first value (e.g., 0 in the restricted TWT schedule information subfield 522) may indicate that the TWT schedule does not have any member device. The second value (e.g., 1 in the restricted TWT schedule information subfield 522) may indicate that the TWT schedule has at least one member device. The third value (e.g., 2 in the restricted TWT schedule information subfield 522) may indicate that the TWT schedule does not accept a request from a device to establish a new membership. In one approach, the AP device may wirelessly transmit 1006, via the transmitter over a wireless local area network (WLAN), the generated frame (e.g., TWT advertisement frame 940).

Figure 11:
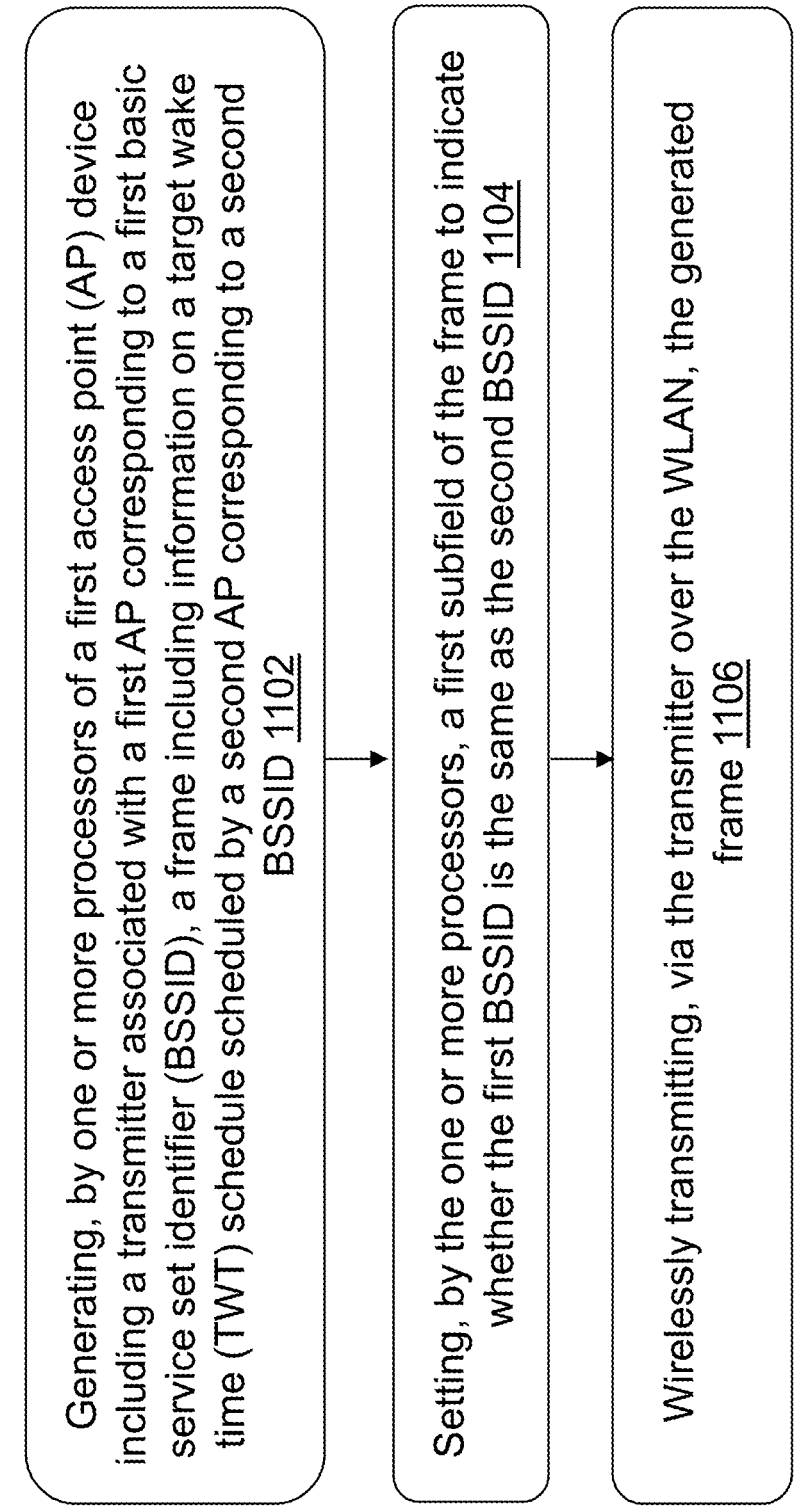
FIG. 11 is a flowchart showing a process of announcing TWT schedules for a multiple BSSID set and/or an overlapping BSS (OBSS), according to an example implementation of the present disclosure.

FIG. 11 is a flowchart showing a process 1100 of announcing TWT schedules for a multiple BSSID set and/or an overlapping BSS (OBSS), according to an example implementation of the present disclosure. In some embodiments, the process 1100 is performed by a first AP device (e.g., AP 105, AP device 910) including one or more processors (e.g., processors 316) and a transmitter (e.g., network interface 320) associated with a first AP (e.g., AP device 910 or a transmitting AP) corresponding to a first BSSID (e.g., BSSID of the AP device 910 or a transmitted BSSID). In some embodiments, the process 1100 is performed by other entities. In some embodiments, the process 1100 includes more, fewer, or different steps than shown in FIG. 11.

In one approach, the first AP device may generate 1102 a frame (e.g., TWT advertisement frame 940) including information on a target wake time (TWT) schedule scheduled by a second AP (e.g., an AP corresponding to a nontransmitted BSSID or an AP of an OBSS) corresponding to a second BSSID (e.g., a nontransmitted BSSID or a BSSID of an OBSS). In some embodiments, the TWT schedule may be a restricted TWT (R-TWT) schedule. The frame may be a beacon frame or a probe response frame.

In one approach, the first AP device may set 1104 a first subfield of the frame (e.g., restricted TWT schedule information subfield 522) to indicate whether the first BSSID is the same as the second BSSID (e.g., whether the second BSSID is a transmitted BSSID or not). In some embodiments, the first subfield may indicate that the first BSSID is not the same as the second BSSID (e.g., the second BSSID is a nontransmitted BSSID or a BSSID of an OBSS). The information on the TWT schedule scheduled by the second AP may include information on a start time of a TWT service period of the TWT schedule.

In some embodiments, responsive to the first subfield indicating that the first BSSID is not the same as the second BSSID (e.g., the second BSSID is a nontransmitted BSSID or a BSSID of an OBSS), the one or more processors may set a second subfield of the frame (e.g., MBSS/OBSS field; a reserved bit in the broadcast TWT information field 518 or a bit in the restricted TWT traffic information subfield 522) to indicate whether (1) the first BSSID and the second BSSID are included in a multiple BSSID set (e.g., the second BSSID is a nontransmitted BSSID) or (2) the second AP is associated with an AP device different from the first AP device (e.g., the second BSSID is a BSSID of an OBSS). Responsive to the first subfield indicating that the first BSSID is the same as the second BSSID (e.g., when the second BSSID is the transmitted BSSID), the one or more processors may set a third subfield of the frame (e.g., broadcast TWT ID subfield 523) to indicate an identifier of the TWT schedule. Responsive to the second subfield indicating that the second AP is associated with an AP device different from the first AP device (e.g., when the second BSSID is a BSSID of an OBSS), the one or more processors may set the third subfield of the frame (e.g., repurpose the broadcast TWT ID subfield 523) to indicate one of (1) a reserved field, (2) an identifier to identify the TWT schedule among TWT schedules scheduled by the second AP (e.g., an order or a sequence number of schedules from an OBSS), or (3) an identifier to identify a BSS of the second AP (e.g., OBSS ID).

In some embodiments, responsive to the second subfield indicating that the first BSSID and the second BSSID are included in a multiple BSSID set (e.g., when the second BSSID is a nontransmitted BSSID), the one or more processors may set the third subfield of the frame (e.g., repurpose the broadcast TWT ID subfield 523) to indicate one of (1) a reserved field, or (2) an identifier to identify the TWT schedule among TWT schedules scheduled by the second AP (e.g., an order or a sequence number of schedules from the nontransmitted BSSID).

In some embodiments, responsive to the first subfield indicating that the first BSSID is the same as the second BSSID (e.g., when the second BSSID is the transmitted BSSID), the one or more processors may set a fourth subfield of the frame (e.g., the broadcast TWT persistence subfield 524 in FIG. 5A) to indicate a length of a TWT service period of the TWT schedule. Responsive to the second subfield indicating that the second AP is associated with an AP device different from the first AP device (e.g., when the second BSSID is a BSSID of an OBSS), the one or more processors may set the fourth subfield of the frame to indicate one of (1) a reserved field, (2) an identifier to identify the TWT schedule among TWT schedules scheduled by the second AP (e.g., an order or a sequence number of schedules from an OBSS), or (3) at least a portion of the second BSSID. For example, the 8 bits of the broadcast TWT persistence subfield 524 may be set to a portion of BSSID of the OBSS (e.g., BSSID [40:47] (or any 8 bits portion of the BSSID) of the OBSS).

In some embodiments, responsive to the first subfield indicating that the first BSSID is the same as the second BSSID (e.g., when the second BSSID is the transmitted BSSID), the one or more processors may set a fifth subfield of the frame (e.g., the broadcast TWT recommendation subfield 546 in FIG. 5B) to indicate one or more types of frames that are transmitted during a TWT service period of the TWT schedule. Responsive to the second subfield indicating that the second AP is associated with an AP device different from the first AP device (e.g., when the second BSSID is a BSSID of an OBSS), the one or more processors may set the fifth subfield of the frame to indicate one of (1) a reserved field, (2) an identifier to identify the TWT schedule among TWT schedules scheduled by the second AP (e.g., an order or a sequence number of schedules from an OBSS), or (3) an identifier to identify a BSS of the second AP (e.g., OBSS ID).

In some embodiments, responsive to the first subfield indicating that the first BSSID is the same as the second BSSID (e.g., when the second BSSID is the transmitted BSSID), the one or more processors may set a sixth subfield of the frame (e.g., the TWT setup command subfield 546 in FIG. 5B) to indicate a type of a message to set up a TWT session of the TWT schedule. Responsive to the second subfield indicating that the second AP is associated with an AP device different from the first AP device (e.g., when the second BSSID is a BSSID of an OBSS), the one or more processors may set the sixth subfield of the frame to indicate one of (1) a reserved field, (2) an identifier to identify the TWT schedule among TWT schedules scheduled by the second AP (e.g., an order or a sequence number of schedules from an OBSS), or (3) an identifier to identify a BSS of the second AP (e.g., OBSS ID).

In one approach, the first AP device may wirelessly transmit 1106, via the transmitter over a wireless local area network (WLAN), the generated frame.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A first access point (AP) device comprising:
   a transmitter associated with a first AP corresponding to a first basic service set identifier (BSSID); and
   one or more processors configured to:
      generate a frame including information on a target wake time (TWT) schedule scheduled by a second AP corresponding to a second BSSID;
      set a first subfield of the frame to indicate whether the first BSSID is the same as the second BSSID;
      determine whether the second AP corresponds to an AP in a multiple BSSID set or a neighboring AP in an overlapping BSS (OBSS);
      responsive to the second AP corresponding to the AP in the multiple BSSID set, set a second subfield of the frame to indicate that the first BSSID and the second BSSID are included in the multiple BSSID set;
      responsive to the second AP corresponding to the neighboring AP in the OBSS, set the second subfield of the frame to indicate that the second AP is the neighboring AP in the OBSS; and
      wirelessly transmit, via the transmitter over a wireless local area network (WLAN), the generated frame.

2. The first AP device according to claim 1, wherein the TWT schedule is a restricted TWT (R-TWT) schedule.

3. The first AP device according to claim 1, wherein the first frame is a beacon frame or a probe response frame.

4. The AP device according to claim 1, wherein
the first subfield indicates that the first BSSID is not the same as the second BSSID, and
the information on the TWT schedule scheduled by the second AP includes information on a start time of a TWT service period of the TWT schedule.

5. The first AP device according to claim 1, wherein
responsive to the first subfield indicating that the first BSSID is the same as the second BSSID, the one or more processors are configured to set a third subfield of the frame to indicate an identifier of the TWT schedule, and
responsive to (1) the first subfield indicating that the first BSSID is not the same as the second BSSID and (2) the second subfield indicating that the second AP is the neighboring AP in the OBSS, the one or more processors are configured to set the third subfield of the frame to indicate one of (1) a reserved field, (2) an identifier to identify the TWT schedule among TWT schedules scheduled by the second AP, or (3) an identifier to identify a BSS of the second AP.

6. The first AP device according to claim 5, wherein
responsive to (1) the first subfield indicating that the first BSSID is not the same as the second BSSID and (2) the second subfield indicating that the first BSSID and the second BSSID are included in a multiple BSSID set, the one or more processors are configured to set the third subfield of the frame to indicate one of (1) a reserved field or (2) an identifier to identify the TWT schedule among TWT schedules scheduled by the second AP.

7. The first AP device according to claim 1, wherein
responsive to the first subfield indicating that the first BSSID is the same as the second BSSID, the one or more processors are configured to set a fourth subfield of the frame to indicate a length of a TWT service period of the TWT schedule, and
responsive to (1) the first subfield indicating that the first BSSID is not the same as the second BSSID and (2) the second subfield indicating that the second AP is the neighboring AP in the OBSS, the one or more processors are configured to set the fourth subfield of the frame to indicate one of (1) a reserved field or (2) at least a portion of the second BSSID.

8. The first AP device according to claim 1, wherein
responsive to the first subfield indicating that the first BSSID is the same as the second BSSID, the one or more processors are configured to set a fifth subfield of the frame to indicate one or more types of frames that are transmitted during a TWT service period of the TWT schedule, and
responsive to (1) the first subfield indicating that the first BSSID is not the same as the second BSSID and (2) the second subfield indicating that the second AP is the neighboring AP in the OBSS, the one or more processors are configured to set the fifth subfield of the frame to indicate one of (1) a reserved field, (2) an identifier to identify the TWT schedule among TWT schedules scheduled by the second AP, or (3) an identifier to identify a BSS of the second AP.

9. The first AP device according to claim 1, wherein
responsive to the first subfield indicating that the first BSSID is the same as the second BSSID, the one or more processors are configured to set a sixth subfield of the frame to indicate a type of a message to set up a TWT session of the TWT schedule, and
responsive to (1) the first subfield indicating that the first BSSID is not the same as the second BSSID and (2) the second subfield indicating that the second AP is the neighboring AP in the OBSS, the one or more processors are configured to set the sixth subfield of the frame to indicate one of (1) a reserved field, (2) an identifier to identify the TWT schedule among TWT schedules scheduled by the second AP, or (3) an identifier to identify a BSS of the second AP.

10. A method comprising:
generating, by one or more processors of a first access point (AP) device including a transmitter associated with a first AP corresponding to a first basic service set identifier (BSSID), a frame including information on a target wake time (TWT) schedule scheduled by a second AP corresponding to a second BSSID;
setting, by the one or more processors, a first subfield of the frame to indicate whether the first BSSID is the same as the second BSSID;
determining whether the second AP corresponds to an AP in a multiple BSSID set or a neighboring AP in an overlapping BSS (OBSS);
responsive to the second AP corresponding to the AP in the multiple BSSID set, setting, by the one or more processors, a second subfield of the frame to indicate that the first BSSID and the second BSSID are included in a multiple BSSID set;
responsive to the second AP corresponding to the neighboring AP in the OBSS, setting, by the one or more processors, the second subfield of the frame to indicate that the second AP is the neighboring AP in the OBSS; and
wirelessly transmit, via the transmitter over a wireless local area network (WLAN), the generated frame.

11. The method according to claim 10, wherein the TWT schedule is a restricted TWT (R-TWT) schedule.

12. The method according to claim 10, wherein the first frame is a beacon frame or a probe response frame.

13. The method according to claim 10, wherein
the first subfield indicates that the first BSSID is not the same as the second BSSID, and
the information on the TWT schedule scheduled by the second AP includes information on a start time of a TWT service period of the TWT schedule.

14. The method according to claim 10, further comprising:
responsive to the first subfield indicating that the first BSSID is the same as the second BSSID, setting a third subfield of the frame to indicate an identifier of the TWT schedule; and
responsive to (1) the first subfield indicating that the first BSSID is not the same as the second BSSID and (2) the second subfield indicating that the second AP is the neighboring AP in the OBSS, setting the third subfield of the frame to indicate one of (1) a reserved field, (2) an identifier to identify the TWT schedule among TWT schedules scheduled by the second AP, or (3) an identifier to identify a BSS of the second AP.

15. The method according to claim 14, further comprising:
responsive to (1) the first subfield indicating that the first BSSID is not the same as the second BSSID and (2) the second subfield indicating that the first BSSID and the second BSSID are included in a multiple BSSID set, setting the third subfield of the frame to indicate one of (1) a reserved field, or (2) an identifier to identify the TWT schedule among TWT schedules scheduled by the second AP.

16. The method according to claim 10, further comprising:
responsive to the first subfield indicating that the first BSSID is the same as the second BSSID, setting a fourth subfield of the frame to indicate a length of a TWT service period of the TWT schedule; and
responsive to (1) the first subfield indicating that the first BSSID is not the same as the second BSSID and (2) the second subfield indicating that the second AP is the neighboring AP in the OBSS, setting the fourth subfield of the frame to indicate one of (1) a reserved field, (2) an identifier to identify the TWT schedule among TWT schedules scheduled by the second AP, or (3) at least a portion of the second BSSID.

17. The method according to claim 10, further comprising:
responsive to the first subfield indicating that the first BSSID is the same as the second BSSID, setting a fifth subfield of the frame to indicate one or more types of frames that are transmitted during a TWT service period of the TWT schedule; and
responsive to (1) the first subfield indicating that the first BSSID is not the same as the second BSSID and (2) the second subfield indicating that the second AP is the neighboring AP in the OBSS, setting the fifth subfield of the frame to indicate one of (1) a reserved field, (2) an identifier to identify the TWT schedule among TWT schedules scheduled by the second AP, or (3) an identifier to identify a BSS of the second AP.

18. The method according to claim 10, further comprising:
responsive to the first subfield indicating that the first BSSID is the same as the second BSSID, setting a sixth subfield of the frame to indicate a type of a message to set up a TWT session of the TWT schedule; and
responsive to (1) the first subfield indicating that the first BSSID is not the same as the second BSSID and (2) the second subfield indicating that the second AP is the neighboring AP in the OBSS, setting the sixth subfield of the frame to indicate one of (1) a reserved field, (2) an identifier to identify the TWT schedule among TWT schedules scheduled by the second AP, or (3) an identifier to identify a BSS of the second AP.

* * * * *